United States Patent
Kim et al.

(10) Patent No.: US 10,051,175 B2
(45) Date of Patent: Aug. 14, 2018

(54) METHOD FOR GENERATING SPLIT SCREEN IMAGE AND ELECTRONIC DEVICE THEREOF

(71) Applicant: Samsung Electronics Co., Ltd., Gyeonggi-do (KR)

(72) Inventors: Hyun-Jung Kim, Seoul (KR); Ki-Tae Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 14/256,826

(22) Filed: Apr. 18, 2014

(65) Prior Publication Data

US 2014/0313389 A1  Oct. 23, 2014

(30) Foreign Application Priority Data

Apr. 18, 2013 (KR) .................. 10-2013-0042729

(51) Int. Cl.
| | |
|---|---|
| *H04N 5/222* | (2006.01) |
| *H04N 5/232* | (2006.01) |
| *H04N 5/262* | (2006.01) |
| *H04N 9/04* | (2006.01) |

(52) U.S. Cl.
CPC ..... *H04N 5/23216* (2013.01); *H04N 5/23293* (2013.01); *H04N 5/2621* (2013.01); *H04N 5/2624* (2013.01); *H04N 5/23222* (2013.01)

(58) Field of Classification Search
CPC ............. H04N 1/00411; H04N 1/0044; H04N 1/00469; H04N 5/23293; H04N 5/23216; H04N 5/2624; H04N 5/2621; H04N 5/23222; G06F 3/04842; G06F 3/0488; G06F 3/04886; G09G 1/007
USPC .............. 348/333.01–333.02, 333.11–333.12
See application file for complete search history.

(56) References Cited

U.S. PATENT DOCUMENTS

| | | | | |
|---|---|---|---|---|
| 7,760,239 | B2 * | 7/2010 | Kim ..................... | H04N 5/4401 348/14.01 |
| 8,310,582 | B2 * | 11/2012 | Yoon ................... | G06F 3/04845 345/635 |
| 8,339,415 | B2 * | 12/2012 | Sekizawa ............. | G11B 27/034 345/619 |
| 8,990,719 | B2 * | 3/2015 | Matas .................... | G06T 11/60 715/765 |
| 9,148,618 | B2 * | 9/2015 | Matas .................... | H04N 5/772 |
| 9,158,492 | B2 * | 10/2015 | Miyata .................. | G06F 3/1205 |
| 9,204,051 | B2 * | 12/2015 | Masugi ............. | H04N 5/23216 |
| 2006/0268129 | A1 * | 11/2006 | Deng .................... | H04N 5/232 348/239 |
| 2007/0186181 | A1 | 8/2007 | Bok et al. | |
| 2010/0302409 | A1 | 12/2010 | Matas et al. | |
| 2012/0162459 | A1 * | 6/2012 | Cheng ................ | H04N 5/23216 348/222.1 |

(Continued)

FOREIGN PATENT DOCUMENTS

KR  10-2006-0116094  11/2006

*Primary Examiner* — Ngoc-Yen Vu

(57) ABSTRACT

A method and an apparatus for generating a split screen image in an electronic device. The method for generating the image includes capturing an image, displaying the captured image on a display, changing one or more of a location, a size, and a shape of the captured image displayed on the display, and displaying a second image outside a region displaying the captured image on the display.

30 Claims, 34 Drawing Sheets

(56) References Cited

U.S. PATENT DOCUMENTS

| | | | |
|---|---|---|---|
| 2014/0035869 A1* | 2/2014 | Yun | G06F 3/0414 |
| | | | 345/174 |
| 2014/0211065 A1* | 7/2014 | Sudheendra | H04N 5/23293 |
| | | | 348/333.02 |
| 2015/0109436 A1* | 4/2015 | Chen | H04N 19/70 |
| | | | 348/143 |

* cited by examiner

METHOD FOR GENERATING SPLIT SCREEN IMAGE AND ELECTRONIC DEVICE THEREOF

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Apr. 18, 2013, and assigned Serial No. 10-2013-0042729, the entire disclosure of which is hereby incorporated by reference.

TECHNICAL FIELD

The present disclosure relates generally to a method for generating a split screen image and an electronic device thereof.

BACKGROUND

In accordance with growth of information communication technology and semiconductor technology, various electronic devices are advancing to multimedia devices for providing diverse multimedia services. For example, a portable electronic device can provide various multimedia services such as broadcasting service, wireless Internet service, camera service, and music play service.

The electronic device demands a method for providing various services to satisfy user's needs using an image acquired by an image sensor.

SUMMARY

To address the above-discussed deficiencies, it is a primary object to provide an apparatus and a method for generating a split screen image in an electronic device.

Another aspect of the present disclosure is to provide an apparatus and a method for generating a split screen image without using a split screen frame in an electronic device.

Yet another aspect of the present disclosure is to provide an apparatus and a method for editing a captured image in an imaging mode of an electronic device.

Still another aspect of the present disclosure is to provide an apparatus and a method for determining a preview display region by considering captured image editing in an electronic device.

A further aspect of the present disclosure is to provide an apparatus and a method for displaying one or more captured images and a preview image in an electronic device.

A further aspect of the present disclosure is to provide an apparatus and a method for capturing one or more captured images and a preview image displayed on a display, as a single image in an electronic device.

A further aspect of the present disclosure is to provide an apparatus and a method for displaying a split screen image by considering arrangement information of the split screen image in an electronic device.

According to one aspect of the present disclosure, a method for capturing an image in an electronic device includes capturing a first image; displaying the first image on a display; changing one or more of a location, a size, and a shape of the first image displayed on the display; and displaying a second image outside a region displaying the first image on the display.

The method may further include after displaying the second image, capturing the second image; and combining the captured first image and second image to a single image.

The method may further include, when the captured first image and second image are combined to the single image, storing the captured first image and second image as the single image.

The method may further include, when the captured first image and second image are combined to the single image, individually storing the first image and second image combined to the single image; and storing arrangement information of the first image and the second image of the single image.

According to another aspect of the present disclosure, an electronic device includes an image sensor; a display; and a processor for controlling to, when capturing a first image, display the first image on the display, to change one or more of a location, a size, and a shape of the first image displayed on the display, and to display a second image fed from the image sensor outside a region displaying the first image on the display.

After the display displays the second image fed from the image sensor outside the first image, the processor may capture the second image and combine the captured first image and second image to a single image.

The electronic device may further include a memory for storing data. When the captured first image and second image are combined to the single image, the processor stores the captured first image and second image displayed on the display, as the single image in the memory.

The electronic device may further include a memory for storing data. When the captured first image and second image are combined to the single image, the processor individually stores the first image and second image combined as the single image, in the memory, and stores arrangement information of the first image and the second image of the single image in the memory.

According to yet another aspect of the present disclosure, a method for capturing an image in an electronic device includes displaying a first image in a first region of a display; displaying a second image in a second region of the display; and when a capture event occurs, combining the first image and the second image to a third image.

The method may further include storing the first image and the second image as the third image.

The method may further include, storing the first image and the second image individually; and storing arrangement information of the first image and the second image of the third image.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE DISCLOSURE

Figure 1A:
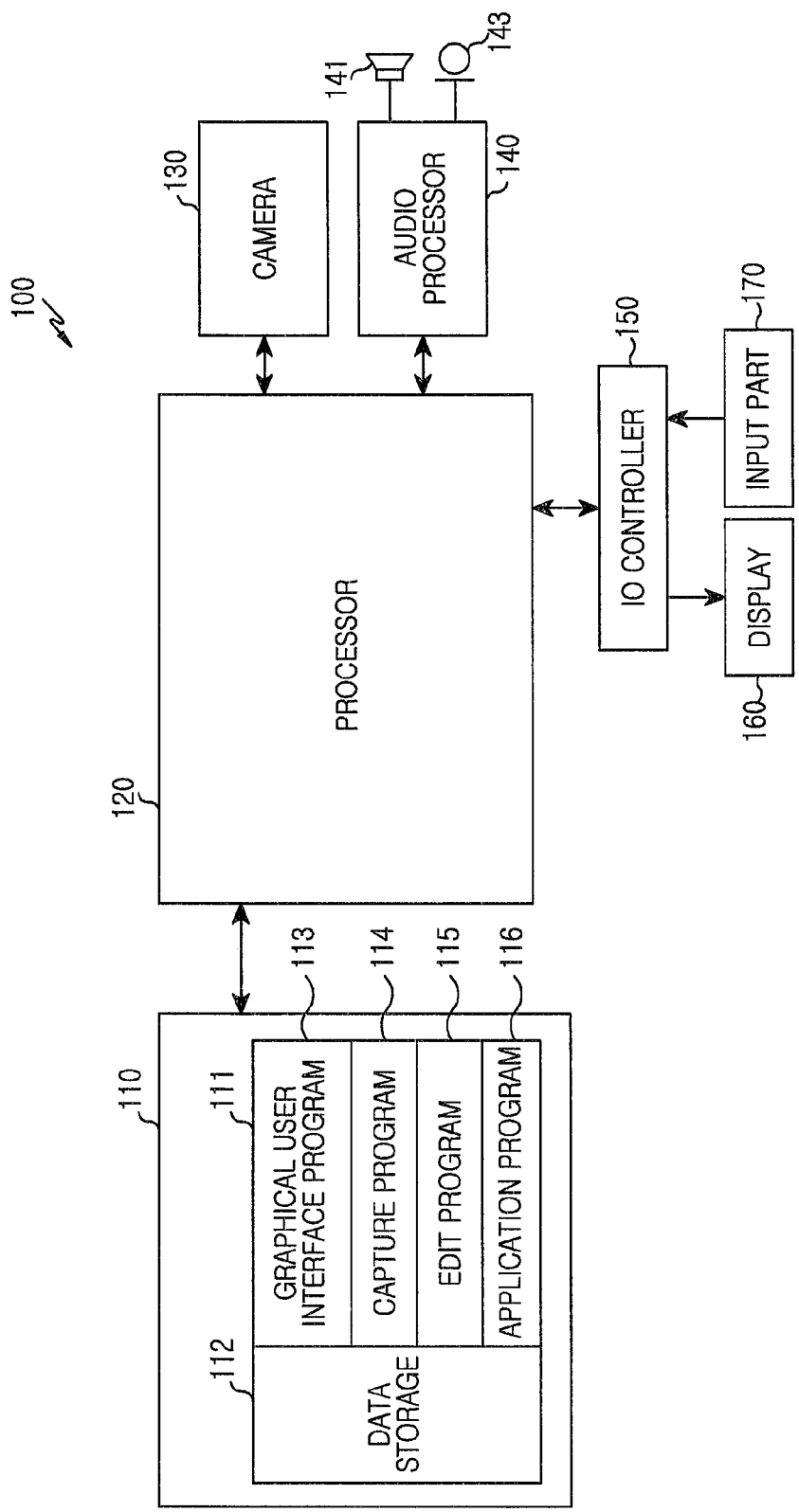
FIG. 1A is a block diagram of an electronic device according to an exemplary embodiment of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for generating a split screen image in an electronic device.

Hereinafter, the electronic device can employ one or more of a portable electronic device including an image sensor, a portable terminal, a mobile terminal, a mobile pad, a media player, a Personal Digital Assistant (PDA), a desktop computer, a laptop computer, a smart phone, a netbook computer, a television, a Mobile Internet Device (MID), an Ultra Mobile Personal Computer (UMPC), a tablet PC, a navigation system, a smart TV, a wrist watch, a digital camera, and an MP3 player. The electronic device may be an electronic device combining two or more functions of those devices. Hereinafter, the image sensor can be referred to as a camera.

Hereinafter, capturing is a series of operations for acquiring an image through the image sensor of the electronic device so as to store the image in a memory, and may be referred to as imaging.

FIG. 1A is a block diagram of an electronic device according to an exemplary embodiment of the present disclosure.

As shown in FIG. 1A, the electronic device 100 includes a memory 110, a processor 120, a camera 130, an audio processor 140, an Input Output (JO) controller 150, a display 160, and an input part 170. Herein, at least one of the processor 120 and the memory 110 can include a plurality of them.

The memory 110 can include a program storage 111 for storing one or more programs to control operations of the electronic device 100 and a data storage 112 for storing data generated by the electronic device 100.

The data storage 112 can store a split screen image captured by the processor 120. For example, when the display 160 is displaying one or more captured images and the processor 120 captures a preview image, the data storage 112 can combine and store the one or more captured images and the preview image displayed on the display 160, as the single split screen image. The data storage 112 may store the one or more captured images and the preview image displayed on the display 160 separately from the split screen image. For example, when the display 160 is displaying one or more captured images and the processor 120 captures the preview image, the data storage 112 may separately store the one or more captured images and the preview image displayed on the display 160 and additionally store arrangement information of the split screen image. The arrangement information can adopt a format such as Extensible Markup Language (XML), HyperText Markup Language (HTML), Wireless Markup Language (WML), or text. Herein, the arrangement information can include one or more of identification information, a location, and a display order of the captured images of the screen split image.

The program storage 111 can include a Graphical User Interface (GUI) program 113, a capture program 114, an edit program 115, and at least one application program 116. Herein, the program in the program storage 111 may be referred to as an instruction set, which is a set of instructions.

Figure 4A:
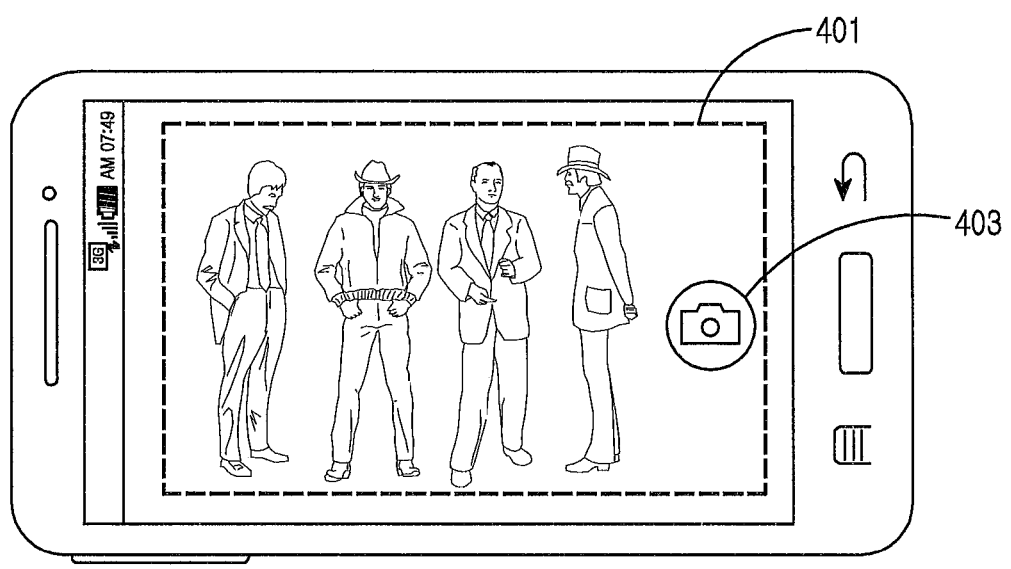
FIGS. 4A through 4E illustrate a screen for capturing the split screen image in the electronic device according to an exemplary embodiment of the present disclosure.
Figure 4B:
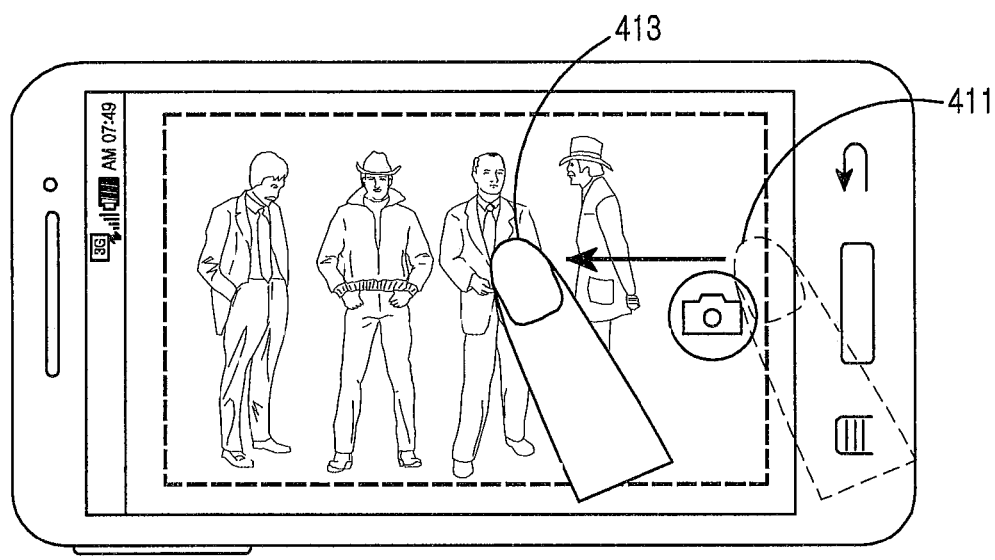
Figure 4C:
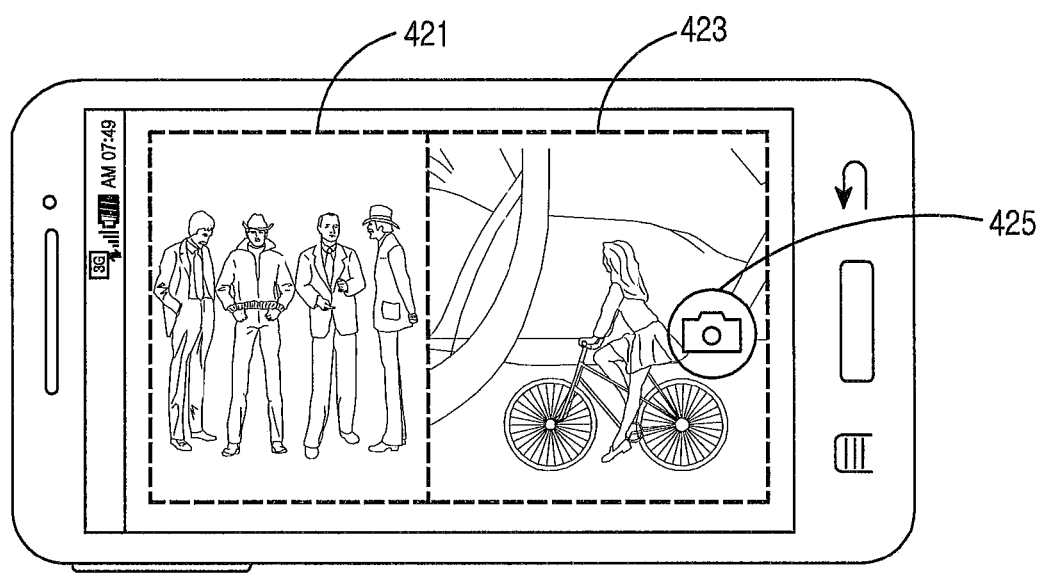

The GUI program 113 includes at least one software component for providing a GUI on the display 160. The GUI program 113 can control the display 160 to display application program information driven by the processor 120. When a split screen image generation service is provided, the GUI program 113 can control the display 160 to display one or more captured images and the preview image to generate the split screen image. For example, the GUI program 113 can control the display 160 to display a preview image 401 fed from the camera 130 as shown in FIG. 4A. When the capture program 114 captures the preview image 401 on the display 160 as shown in FIG. 4A, the GUI program 113 can control the display 160 to display the captured image as shown in FIG. 4B. Next, when the edit program 115 changes a size of the captured image as shown in FIG. 4B, the GUI program 113 can control the display 160 to display a preview image 423 outside the captured image 421 as shown in FIG. 4C.

Figure 4D:
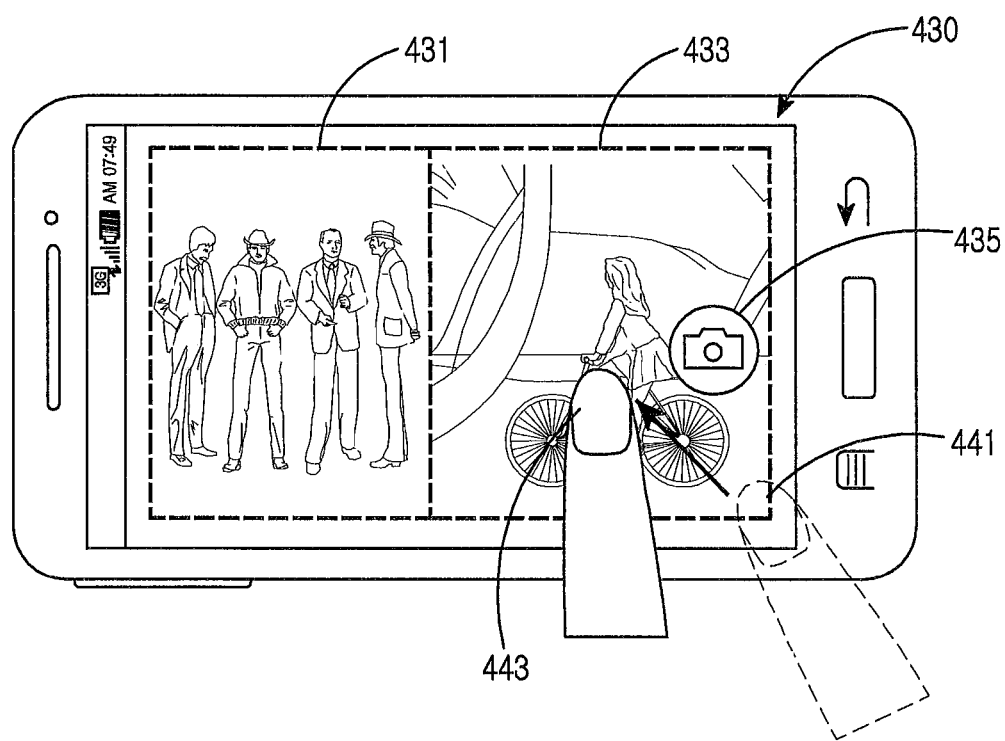

The capture program 114 can include at least one software component for capturing the image acquired by the camera 130. For example, when a capture event occurs to the preview image 401 on the display 160 as shown in FIG. 4A, the capture program 114 can capture the preview image 401 displayed on the display 160. For example, the capture program 114 may capture the preview image with one or more captured images displayed on the display 160 and create one split screen image. More specifically, when the capture event occurs to the captured image 421 and the preview image 423 displayed on the display 160 as shown in FIG. 4C, the capture program 114 can capture the preview image 423 and combine the captured image 421 and the captured preview image 423 to a single split screen image 430 as shown in FIG. 4D. In so doing, the capture program 114 can detect the capture event based on selection information of a camera icon 403 or 425, input information of a camera button, or touch detection information of the preview image 401 or 423.

Figure 14A:
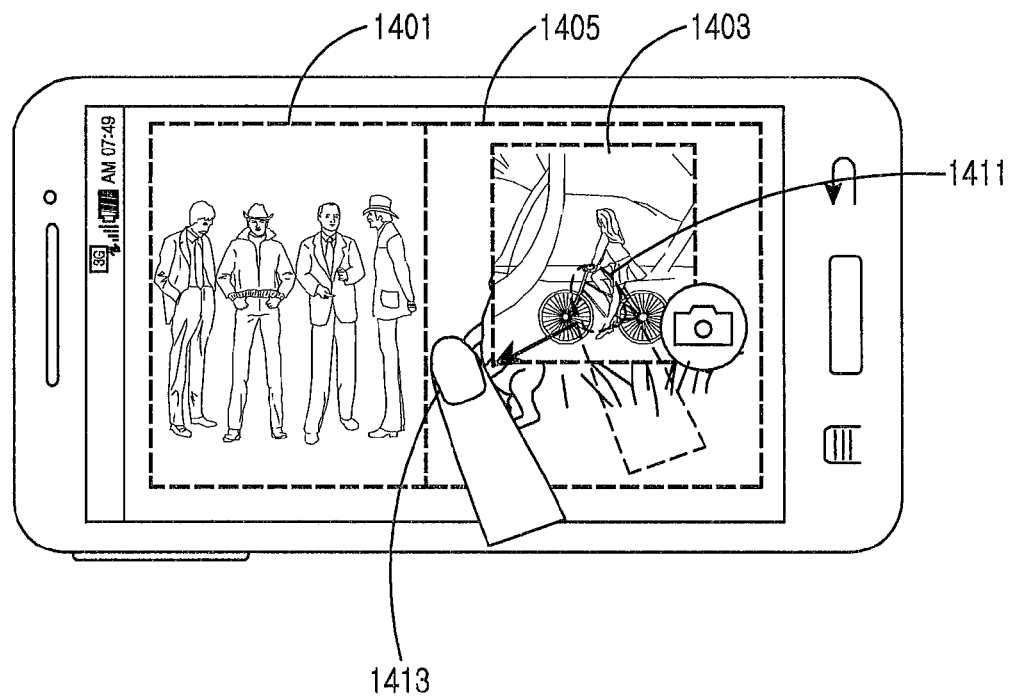
FIGS. 14A and 14B illustrate a screen for moving the captured image in the electronic device according to an exemplary embodiment of the present disclosure.
Figure 14B:
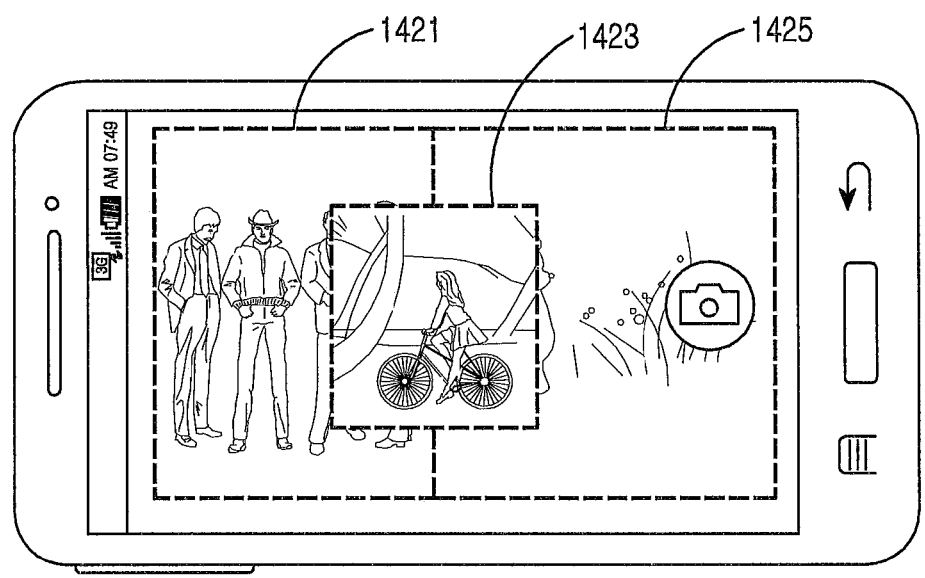
Figure 16:
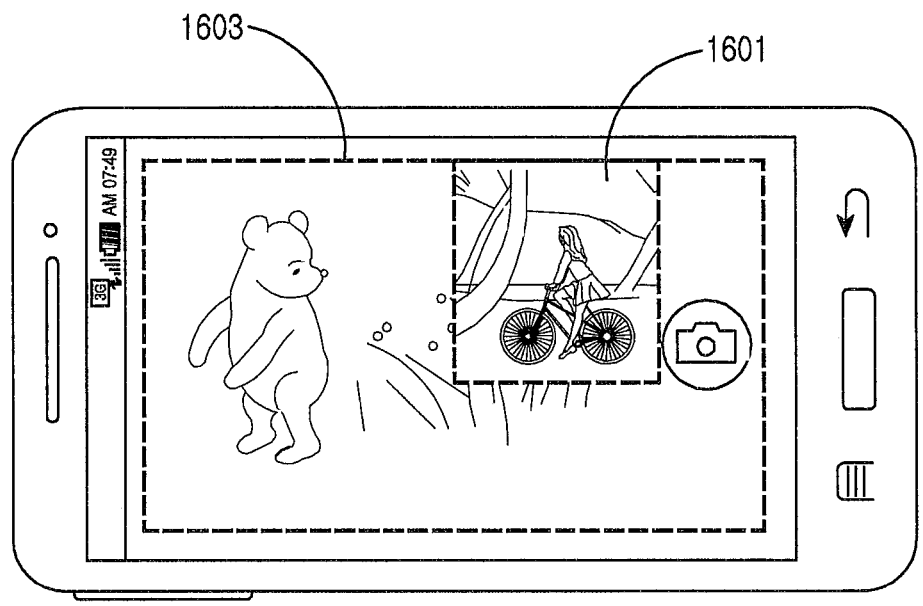
FIG. 16 illustrates a screen for deleting the captured image in the electronic device according to an exemplary embodiment of the present disclosure.
Figure 18:
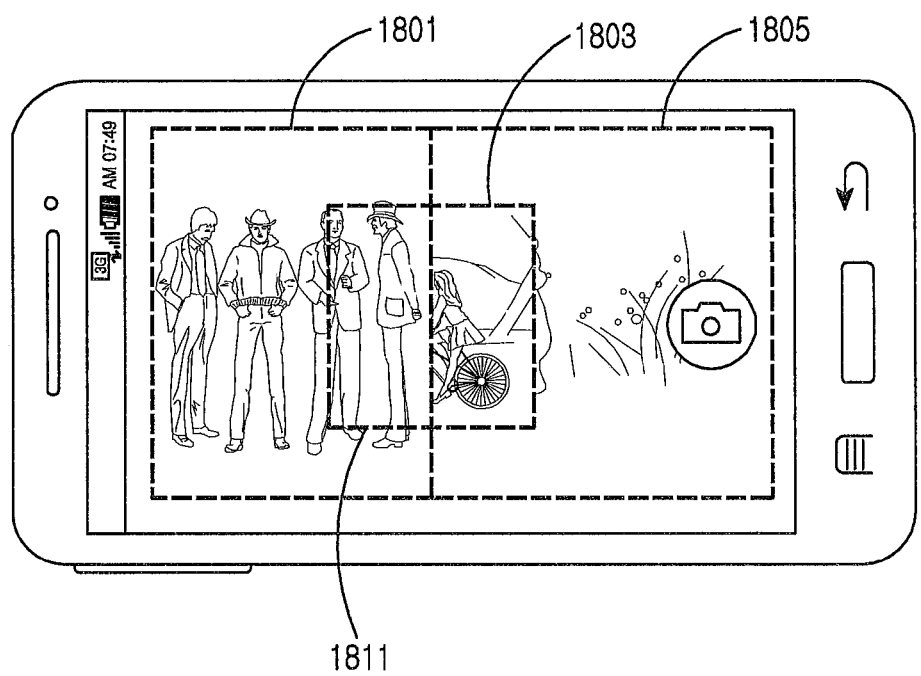
FIG. 18 illustrates a screen for arranging the captured image in the electronic device according to an exemplary embodiment of the present disclosure.
Figure 20A:
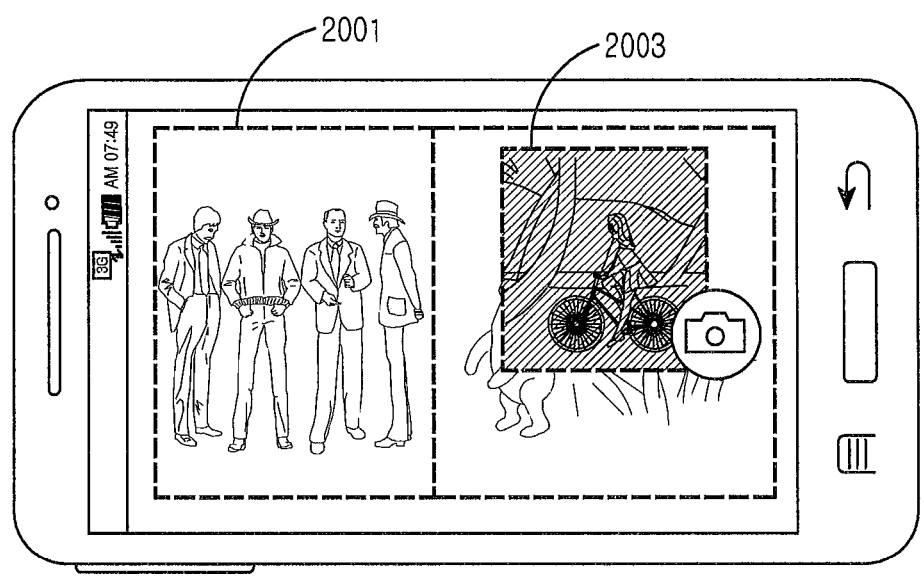
FIGS. 20A and 20B illustrate a screen for adding the image effect to the captured image in the electronic device according to an exemplary embodiment of the present disclosure.
Figure 20B:
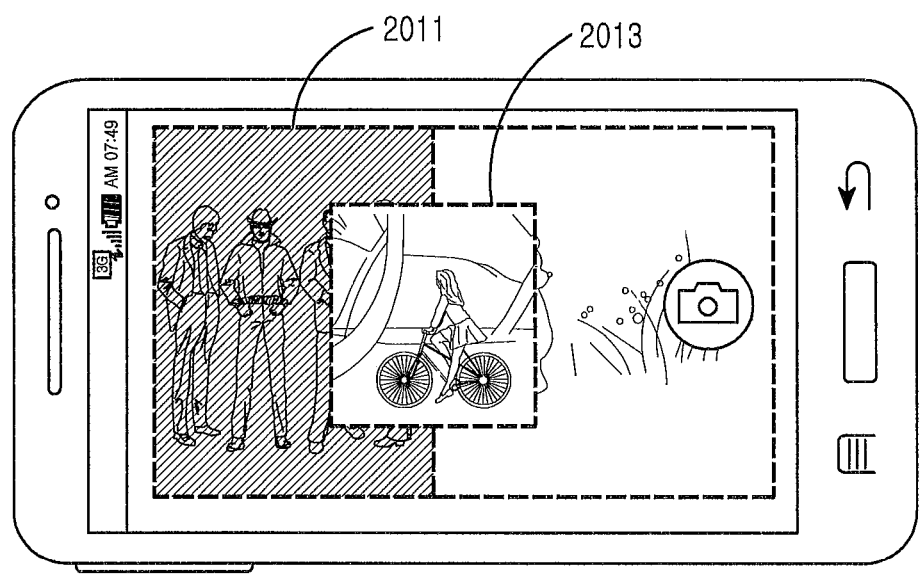

The edit program 115 can include at least one software program for editing the captured image displayed on the display 160. The edit program 115 can edit the captured image displayed on the display 160 according to input information fed from the input part 170. For example, the edit program 115 can alter the size of the captured image as shown in FIGS. 4B through 4E and 7A through 7D. For example, the edit program 115 may cut part of the captured image as shown in FIGS. 10A, 10B, 12A, and 12B. For example, the edit program 115 may change a location of the captured image as shown in FIGS. 14A and 14B. For example, the edit program 115 may delete one or more of the captured images displayed on the display 160 as shown in FIG. 16. For example, the edit program 115 may arrange the captured images displayed on the display 160 as shown in FIG. 18. For example, the edit program 115 may apply an image effect to one or more of the captured images displayed on the display 160 as shown in FIGS. 20A and 20B. For example, the edit program 115 may add the effect equivalent to the imaging to the captured image by applying a camera filter to the camera 130.

The application program 116 can include a software component for at least one application program installed in the electronic device 100.

The processor 120 controls the electronic device 100 to provide various multimedia services using at least one program. The processor 120 executes at least one program stored in the memory 110 and thus controls to provide the service corresponding to the program. For example, the processor 120 can generate the split screen image by running the GUI program 113 and the capture program 114 stored in the program storage 111. More specifically, the processor 120 can control to edit and display one or more captured images together with the preview image on the display 160. Next, the processor 120 can generate the split screen image by capturing the one or more captured images and the preview image displayed on the display 160 as the single split screen image. For example, when the processor 120 executes the edit program 115 and changes the size of the captured image as shown in FIG. 4B, the processor 120 can control the display 160 to display the preview image 423 outside the captured image 421 as shown in FIG. 4C. When the capture event occurs to the captured image 421 and the preview image 423 displayed on the display 160 as shown in FIG. 4C, the processor 120 can capture the preview image 423 and combine the captured image 421 and the captured preview image 423 to the single split screen image 430 as shown in FIG. 4D.

The processor 120 can execute the edit program 115 stored in the program storage 111 and thus edit the captured image displayed on the display 160. For example, the processor 120 can alter the size of the captured image as shown in FIGS. 4B through 4E and 7A through 7D. In so doing, the processor 120 may change the size of part of the captured image displayed on the display 160. For example, the processor 120 may cut part of the captured image as shown in FIGS. 10A, 10B, 12A, and 12B. For example, the processor 120 may change the location of the captured image as shown in FIGS. 14A and 14B. For example, the processor 120 may delete one or more of the captured images displayed on the display 160 as shown in FIG. 16. For example, the processor 120 may arrange the captured images displayed on the display 160 as shown in FIG. 18. In so doing, the processor 120 can arrange the order of the captured images by changing data of the overlapping captured images based on their order in a buffer containing the captured images and the preview image displayed on the display 160. For example, the processor 120 may apply the image effect to one or more of the captured images displayed on the display 160 as shown in FIGS. 20A and 20B. In so doing, the processor 120 may add the image effect to a particular captured image region in the buffer containing the captured images and the preview image displayed on the display 160.

The camera 130 can provide the processor 120 with the image collected and obtained by imaging an object. In detail, the camera 130 can include a camera sensor for converting an optical signal to an electric signal and an Image Signal Processor (ISP) for converting an analog image signal to a digital image signal. Herein, the camera 130 can include at least one camera connected to the electronic device 100. For example, the camera 130 can include a first camera in a front side of the electronic device 100 and a second camera in a back side.

The audio processor 140 provides an audio interface between the user and the electronic device 100 through a speaker 141 and a microphone 143.

The IO controller 150 provides an interface between the IO device such as display 160 and input part 170, and the processor 120.

The display 160 displays status information of the electronic device 100, a character input by the user, a moving picture, and/or a still picture. For example, the display 160 displays the application program information driven by the processor 120. When the processor 120 runs a split screen capture program, the display 160 can display the preview image 401 fed from the camera 130 as shown in FIG. 4A. The display 160 may display the one or more captured images and the preview image as shown in FIG. 4C, 4E, 7B, 7D, 10B, or 12D. In so doing, the display 160 can display the one or more captured images and the preview image by logically or physically dividing a layer for displaying the captured images and a layer for displaying the preview image.

The input part 170 provides input data generated by a user's selection to the processor 120 via the IO controller 150. For doing so, the input part 170 includes a keypad including at least one hardware button, and a touchpad for detecting touch information. For example, the input part 170 can provide the touch information of the touch pad using one or more of a touch pen, a finger, and a gloved finger, to the processor unit 120 via the IO controller 150.

The electronic device 100 may further include a communication system (not shown) for performing a communication function for voice communication and data communication. Herein, the communication system may be divided into a plurality of communication sub-modules for supporting different networks. For example, the communication network includes, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and Near Field Communication (NFC).

As such, the processor 120 can create the split screen image within the single module.

Figure 1B:
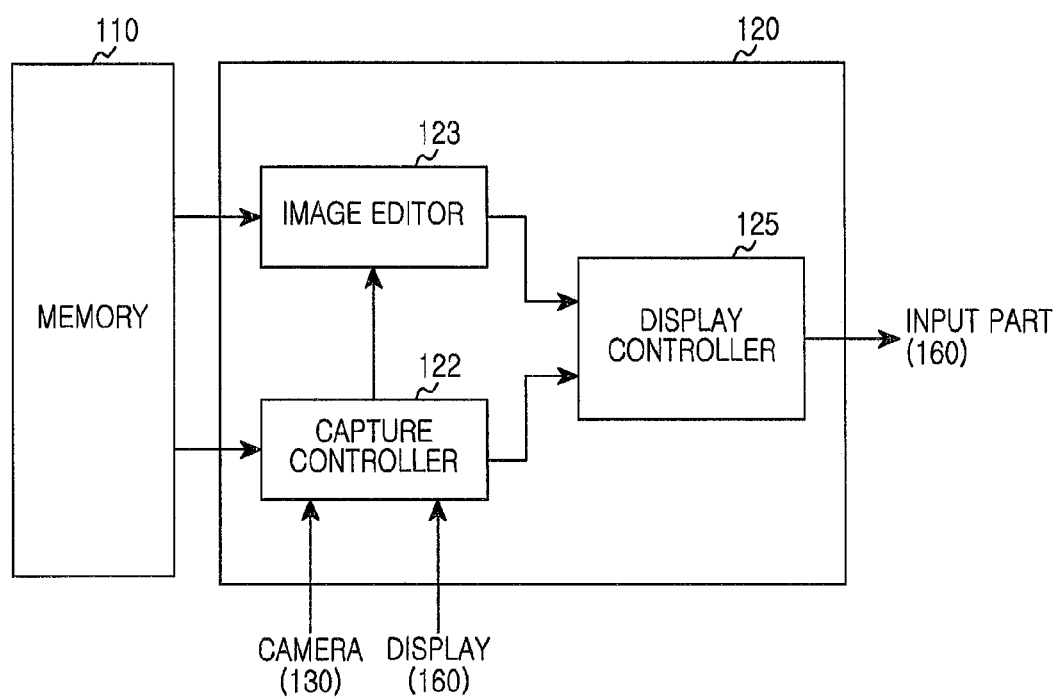
FIG. 1B is a detailed block diagram of a processor according to an exemplary embodiment of the present disclosure.

Alternatively, the processor 120 can include separate modules for generating the split screen image as shown in FIG. 1B.

FIG. 1B is a detailed block diagram of the processor according to an exemplary embodiment of the present disclosure.

As shown in FIG. 1B, the processor 120 can include a capture controller 121, an image editor 123, and a display controller 125.

The capture controller 121 can capture the image obtained through the camera 130. In so doing, the capture controller 121 can capture the image obtained by the camera 130 by running the capture program 114 stored in the program storage 111. For example, when the capture event occurs to the preview image 401 displayed on the display 160 as shown in FIG. 4A, the capture controller 121 can capture the preview image 401 on the display 160. For example, the capture controller 121 may capture the one or more captured images and the preview image displayed on the display 160, as the single split screen image. More specifically, when the capture event occurs to the captured image 421 and the preview image 423 displayed on the display 160 as shown in FIG. 4C, the capture controller 121 can capture the preview image 423 and combine the captured images 431 and the captured preview image 433 to the single split screen image 430 as shown in FIG. 4D. In so doing, the capture controller 121 can detect the capture event based on the selection information of the camera icon 403 or 425, the input information of the camera button, or the touch detection information of the preview image 401 or 423.

The image editor 123 can edit the captured image displayed on the display 160. In so doing, the image editor 123 can execute the edit program 115 stored in the program storage 111 and edit the captured image displayed on the display 160 according to the input information fed from the input part 170. For example, the image editor 123 can alter the size of the captured image as shown in FIGS. 4B through 4E and 7A through 7D. For example, the image editor 123 may cut part of the captured image as shown in FIGS. 10A, 10B, 12A, and 12B. For example, the image editor 123 may change the location of the captured image as shown in FIGS. 14A and 14B. For example, the image editor 123 may delete one or more of the captured images displayed on the display 160 as shown in FIG. 16. For example, the image editor 123 may arrange the order of the captured images displayed on the display 160 as shown in FIG. 18. For example, the image editor 123 may apply the image effect to one or more of the captured images displayed on the display 160 as shown in FIGS. 20A and 20B. For example, the image editor 123 may add the effect equivalent to the imaging to the captured image by applying the camera filter to the camera 130.

The display controller 125 can control to provide the GUI to the display 160. In so doing, the display controller 125 can control to provide the GUI to the display 160 by executing the GUI program 113 stored in the program storage 111. More specifically, the display controller 125 can control the display 160 to display the application program information driven by the processor 120. When the split screen image generation service is provided, the display controller 125 can control the display 160 to display one or more captured images and the preview image to create the split screen image. For example, the display controller 125 can control the display 160 to display the preview image 401 fed from the camera 130 as shown in FIG. 4A. When the capture controller 121 captures the preview image 401 on the display 160 as shown in FIG. 4A, the display controller 125 can control the display 160 to display the captured image as shown in FIG. 4B. Next, when the image editor 123 changes the size of the captured image as shown in FIG. 4B, the display controller 125 can control the display 160 to display the preview image 423 outside the captured image 421 on the display 160 as shown in FIG. 4C.

According to one aspect of the present disclosure, the electronic device includes an image sensor; a display; and a processor for controlling to, when capturing a first image, display to display the first image, to change one or more of a location, a size, and a shape of the first image displayed on the display, and to display a second image fed from the image sensor outside a region displaying the first image.

The second image comprises a preview image.

After display of the second image fed from the image sensor outside the first image, the processor captures the second image and combines the captured first image and second image into a single image.

The electronic device may further include a memory for storing data. When the captured first image and second image are combined to the single image, the processor stores the captured first image and second image displayed on the display as the single image in the memory.

The electronic device may further include a memory for storing data. When the captured first image and second image are combined to the single image, the processor individually stores the first image and second image combined into the single image in the memory, and stores arrangement information of the first image and the second image combined into the single image in the memory.

The arrangement information includes one or more of identification information of the first and second images of the single image, locations of the first and second images of the single image, and a display order of the first and second images of the single image.

When the display displays a plurality of images, the processor captures the plurality of images as a single image.

The processor detects a touch in a preset edit region defined based on edges of the first image, and changes the size of the first image by considering a movement distance of the touch point of the edit region.

The processor detects a touch on the first image, determines a cut region in the first image by considering a movement distance of the touch point, and deletes or extracts image content from the cut region.

The processor determines a location movement region in the first image displayed on the display, and changes the location of the first image in the location movement region by considering touch information of the location movement region.

The processor changes the location of the first image in the location movement region based on the touch information of the location movement region such that the first image overlaps another image displayed on the display.

The processor determines a deletion region by considering touch information of the first image displayed on the display, and deletes image content in the deletion region.

The processor determines an image edit region by considering touch information of the first image displayed on the display, and adds an image effect to the image edit region.

The processor determines an arrangement region by considering touch information of the first image displayed on the display, and, when a plurality of images overlaps in the arrangement region, changes the display order of the images overlapped in the arrangement region.

Figure 2A:
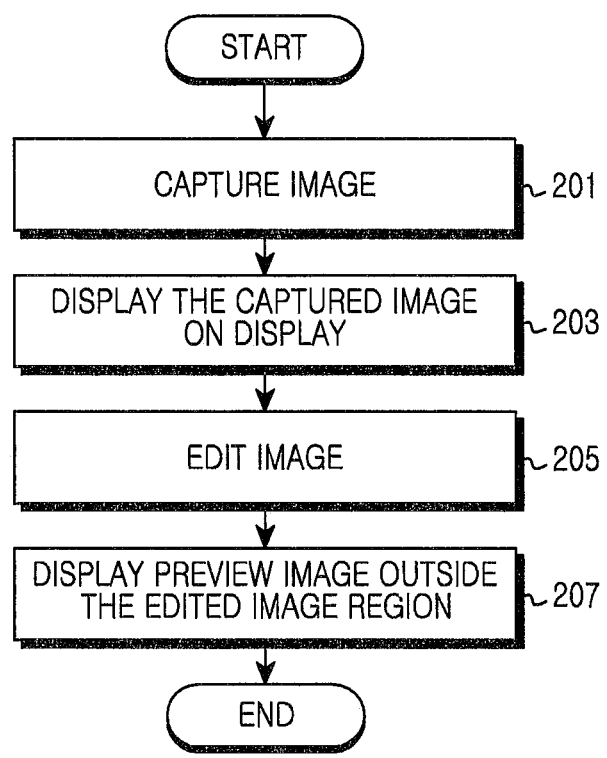
FIG. 2A is a flowchart of a method for capturing a split screen image in the electronic device according to an exemplary embodiment of the present disclosure.

FIG. 2A is a flowchart of a method for capturing the split screen image in the electronic device according to an exemplary embodiment of the present disclosure.

Referring to FIG. 2A, the electronic device captures the image in step 201. For example, when entering a split screen capture mode based on an input signal fed from the input part 170, the electronic device can display the preview 401 acquired by the camera 130 on the display 160 as shown in FIG. 4A. When the capture event takes place, the electronic device can capture the preview image 401 on the display 160. In so doing, the electronic device may store the captured preview image 401 in the memory 110.

In step 203, the electronic device displays the captured image on the display 160. For example, upon capturing the preview image 401 of FIG. 4A according to the capture event, the electronic device can display the captured image on the display 160 as shown in FIG. 4B.

In step 205, the electronic device edits the captured image according to an input signal fed from the input part 170. For example, the electronic device can alter the size of the captured image as shown in FIGS. 4B through 4E and 7A through 7D. In so doing, the electronic device may change the size of part of the captured image displayed on the display 160. For example, the electronic device may cut part of the captured image as shown in FIGS. 10A, 10B, 12A, and 12B. For example, the electronic device may change the location of the captured image as shown in FIGS. 14A and 14B. For example, the electronic device may delete one or more of the captured images displayed on the display 160 as shown in FIG. 16.

In step 207, the electronic device displays the preview image outside the edited captured image on the display 160. For example, when detecting a touch movement 411→413 on the captured image as shown in FIG. 4B, the electronic device can change the size of the captured image 421 based on the touch movement information as shown in FIG. 4C. In so doing, the electronic device can display the preview image 423 outside the captured image 421 on the display 160 as shown in FIG. 4C.

As such, the electronic device can display the one or more captured images and the preview image on the display to create the split screen image. In so doing, the electronic device can include a plurality of modules for the electronic device's operations of FIG. 2A as shown in FIG. 2B.

Figure 2B:
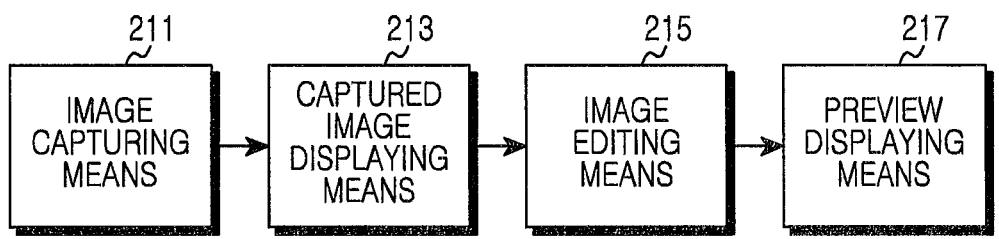
FIG. 2B is a diagram of an apparatus for capturing the split screen image in the electronic device according to an exemplary embodiment of the present disclosure.

FIG. 2B depicts an apparatus for capturing the split screen image in the electronic device according to an exemplary embodiment of the present disclosure.

As shown in FIG. 2B, the electronic device can include an image capturing means 211, a captured image displaying means 213, an image editing means 215, and a preview displaying means 217.

The image capturing means 211 can capture the image displayed on the display 160. For example, when the capture event occurs to the preview image 401 on the display 160 as shown in FIG. 4A, the image capturing means 211 can capture the preview image 401 on the display 160. In so doing, the image capturing means 211 may store the captured preview image 401 in the memory 110.

The captured image displaying means 213 displays the image captured by the image capturing means 411 on the display 160. For example, when the image capturing means 411 captures the preview image 401 of FIG. 4A according to the capture event, the captured image displaying means 213 can display the captured image on the display 160 as shown in FIG. 4B.

The image editing means 215 edits the captured image displayed on the display 160 according to the input signal fed from the input part 170. For example, the image editing means 215 can alter the size of the captured image as shown in FIGS. 4B through 4E and 7A through 7D. In so doing, the image editing means 215 may change the size of part of the captured images displayed on the display 160. For example, the image editing means 215 may cut part of the captured image as shown in FIGS. 10A, 10B, 12A, and 12B. For example, the image editing means 215 may change the location of the captured image as shown in FIGS. 14A and 14B. For example, the image editing means 215 may delete one or more of the captured images displayed on the display 160 as shown in FIG. 16.

The preview displaying means 217 displays the preview image outside the edited captured image on the display 160. For example, when the image editing means 215 changes the size of the captured image 421 as shown in FIG. 4B, the preview displaying means 217 can displays the preview image 423 outside the captured image 421 on the display 160 as shown in FIG. 4C.

Figure 3:
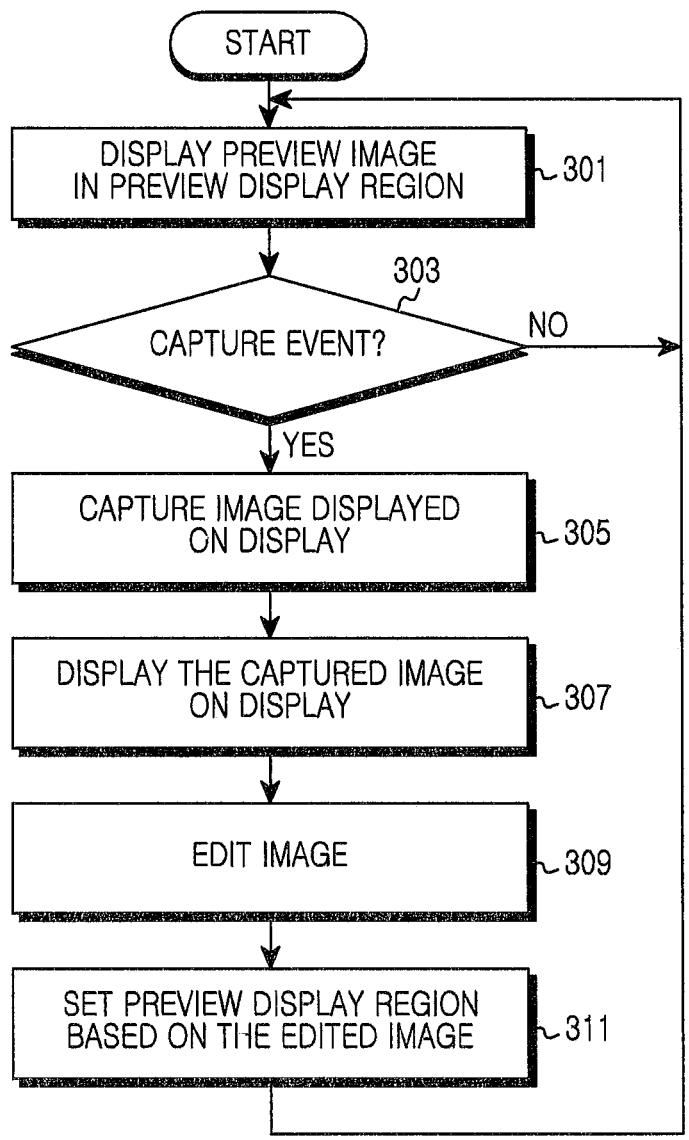
FIG. 3 is a flowchart of a method for capturing the split screen image in the electronic device according to another exemplary embodiment of the present disclosure.

FIG. 3 is a flowchart of a method for capturing the split screen image in the electronic device according to another exemplary embodiment of the present disclosure. Hereafter, the method for capturing the split screen image is explained based on the screens of FIGS. 4A through 4E, which are provided for the purpose of illustrating one example of features of the present disclosure and are not meant to imply any physical or architectural limitations on the various embodiments that can be implemented in accordance with the principles of the present disclosure.

Referring to FIG. 3, the electronic device displays the preview image in a preview display region in step 301. For example, when entering the split screen capture mode based on the input signal fed from the input part 170, the electronic device can display the preview image in at least part of the display 160. Hence, the electronic device can display the preview image 401 acquired by the camera 130 on the display 160 as shown in FIG. 4A.

In step 303, the electronic device determines whether the capture event occurs. For example, the electronic device can determine whether the camera icon 403 of FIG. 4A is selected. For example, the electronic device can determine whether the camera button is input. For example, the electronic device can determine whether the preview image on the display 160 is touched. For example, the electronic device can determine whether a user's gesture corresponding to the capture event is detected.

When the capture event occurs, the electronic device can capture the image displayed on the display 160 in step 305. The electronic device may store the captured preview image in the memory 110.

Figure 6:
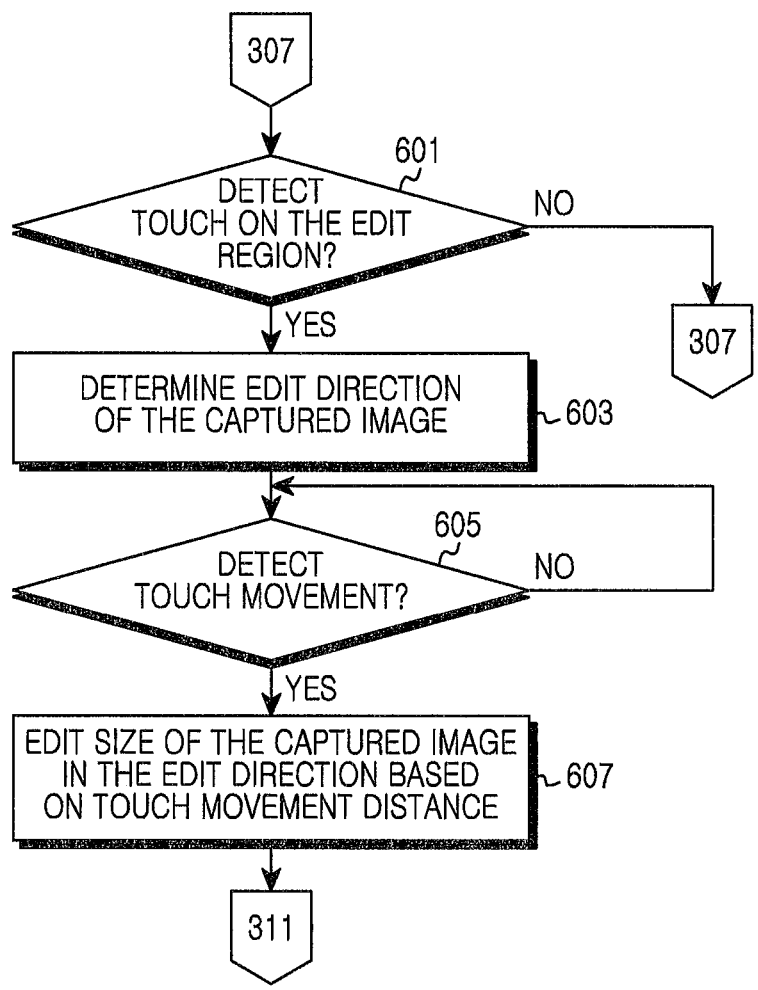
FIG. 6 is a flowchart of a method for editing a size of the captured image in the electronic device according to an exemplary embodiment of the present disclosure.
Figure 8:
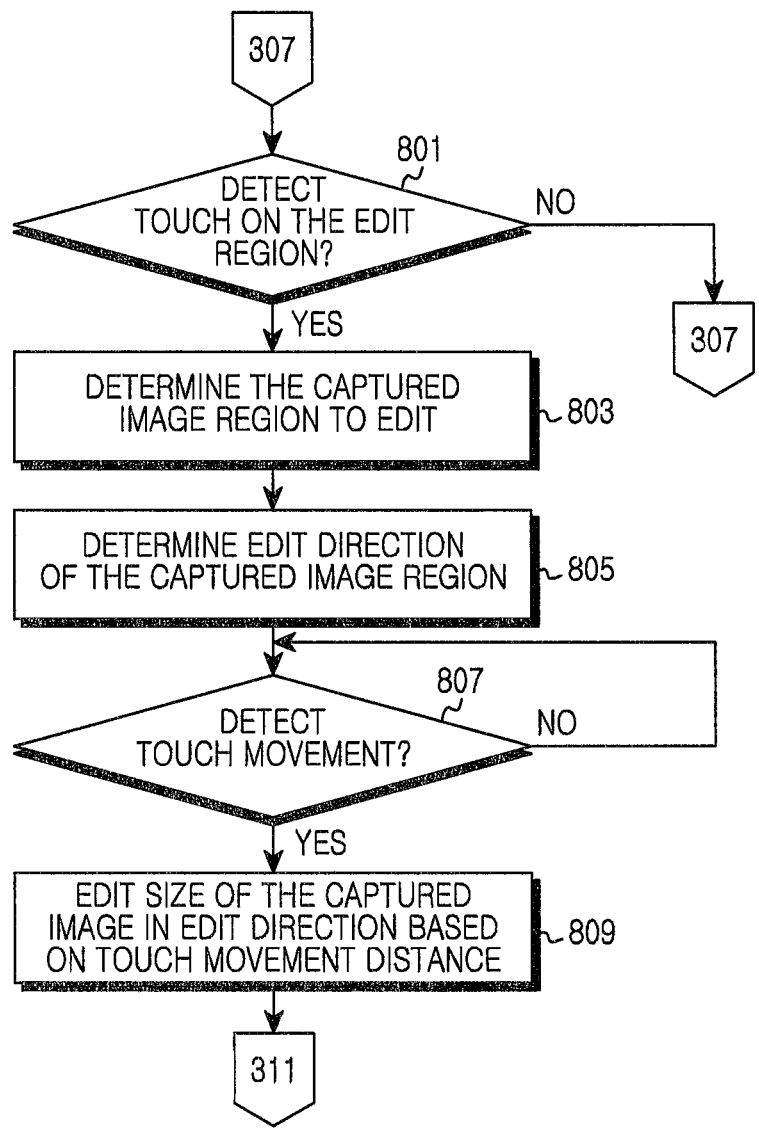
FIG. 8 is a flowchart of a method for editing the captured image size in the electronic device according to another exemplary embodiment of the present disclosure.
Figure 9:
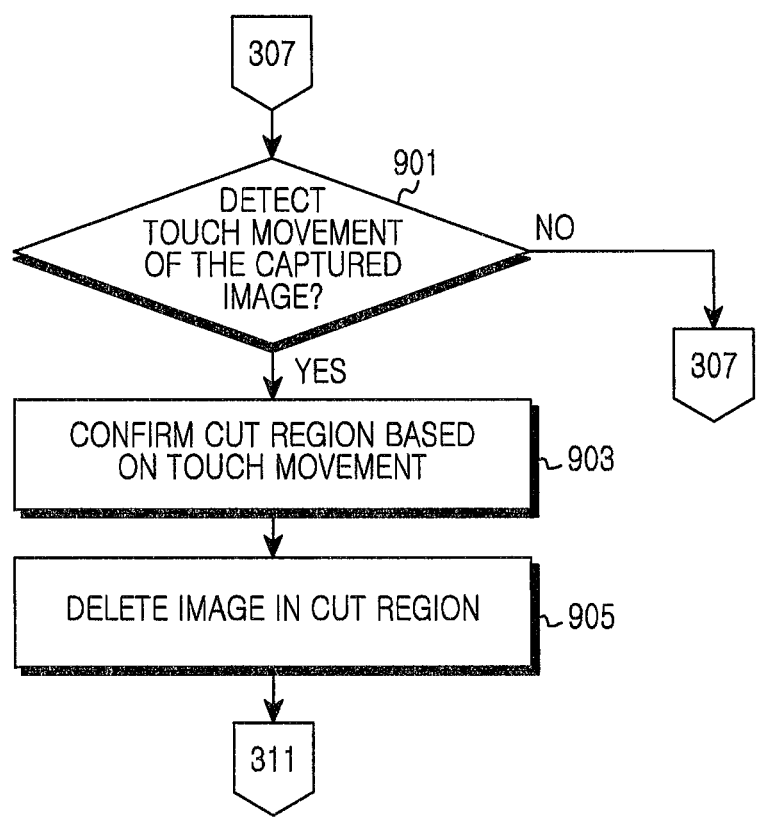
FIG. 9 is a flowchart of a method for cutting the captured image in the electronic device according to an exemplary embodiment of the present disclosure.
Figure 11:
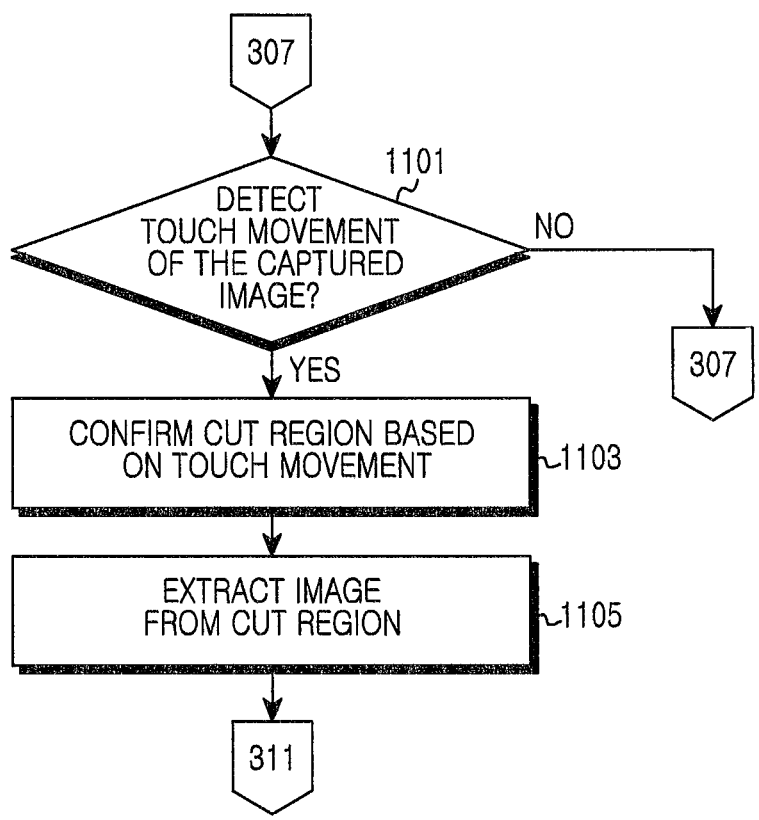
FIG. 11 is a flowchart of a method for cutting the captured image in the electronic device according to another exemplary embodiment of the present disclosure.
Figure 13:
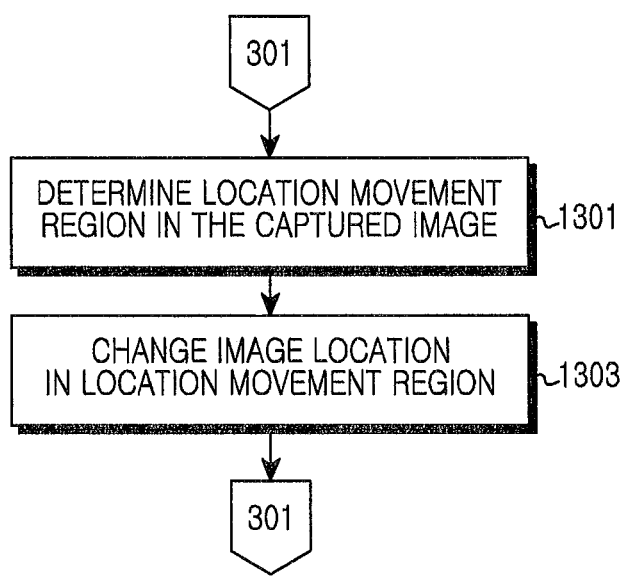
FIG. 13 is a flowchart of a method for moving the captured image in the electronic device according to an exemplary embodiment of the present disclosure.
Figure 15:
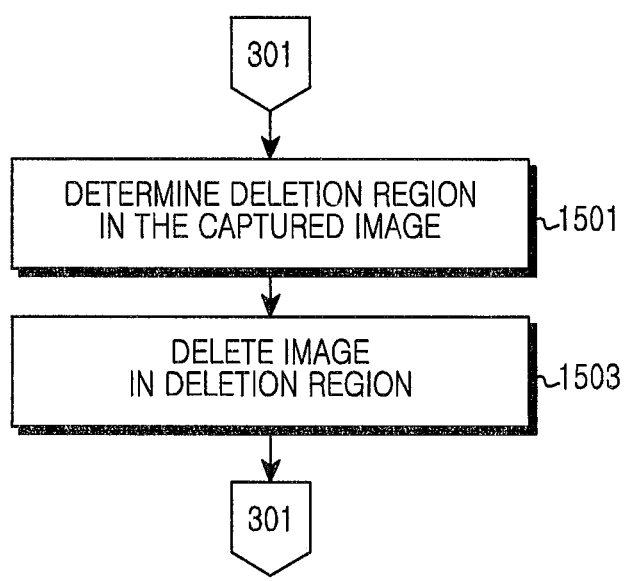
FIG. 15 is a flowchart of a method for deleting the captured image in the electronic device according to an exemplary embodiment of the present disclosure.

In step 307, the electronic device displays the captured image on the display 160. In step 309, the electronic device edits the captured image according to the input signal fed from the input part 170. For example, the electronic device can change the captured image size as shown in FIGS. 6 and 8. In so doing, the electronic device may change the size of part of the captured images displayed on the display 160. For example, the electronic device may cut part of the captured image as shown in FIGS. 9 and 11. For example, the electronic device may change the location of the captured image as shown in FIG. 13. For example, the electronic device may delete one or more of the captured images displayed on the display 160 as shown in FIG. 15.

In step 311, the electronic device sets the preview display region by considering the display region of the edited captured image on the display 160. For example, when detecting the touch movement 411→413 on the captured image as shown in FIG. 4B, the electronic device can change the size of the captured image 421 based on the touch movement information as shown in FIG. 4C. In so doing, the electronic device can designate the region not displaying the captured image 421 as the preview display region on the display 160 as shown in FIG. 4C.

Next, the electronic device displays the preview image in the preview display region in step 301. For example, the electronic device can display the captured image 421 edited in step 309 on the display 160 as shown in FIG. 4C, and display the preview image 423 in the preview display region designated in step 311.

Next, the electronic device determines whether the capture event occurs in step 303.

When the capture event occurs, the electronic device can capture the preview image while displaying one or more captured images on the display 160 in step 305. In so doing, the electronic device can combine the captured images and the captured preview image on the display 160 as the single split screen image. The electronic device may store the split screen image to the memory 110. For example, the electronic device can store one or more captured images and the captured preview image displayed on the display 160, as the single split screen image. In addition, the electronic device may store one or more captured images and the preview image displayed on the display 160 separately from the split screen image. For example, the electronic device may individually store one or more captured images and the captured preview image displayed on the display 160, and additionally store the arrangement information for the split screen image.

In step 307, the electronic device displays the captured image on the display 160. For example, when capturing the preview image 423 on the displayed captured image 421 according to the capture event as shown in FIG. 4C, the electronic device can display the captured image 431 and the captured preview image 433 on the display 160 as shown in FIG. 4D. In so doing, the electronic device may display the split screen image 430 to divide the first captured image 431 and the second captured image 433.

In step 309, the electronic device edits the captured images according to the input signal fed from the input part 170.

Figure 4E:
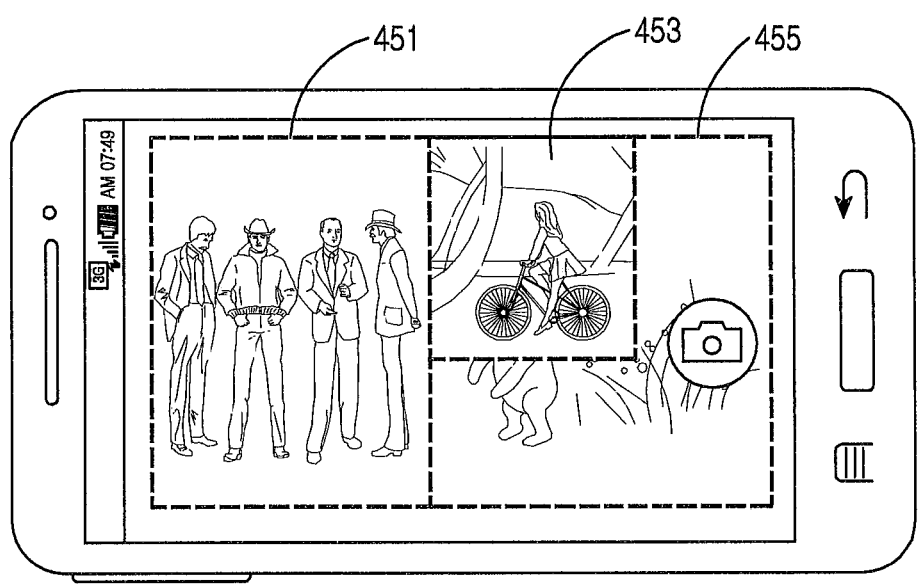

In step 311, the electronic device sets the preview display region by considering the display region of the edited captured image on the display 160. For example, when detecting the touch movement 441→443 on the second captured image 433 in FIG. 4B, the electronic device can change the size of the second captured image 453 based on the touch movement information as shown in FIG. 4E. In so doing, the electronic device can designate the region not displaying the first captured image 451 and the second captured image 453, as the preview display region on the display 160 as shown in FIG. 4E.

Next, the electronic device displays the preview image in the preview display region in step 301. For example, the electronic device can display the captured images 451 and 453 edited in step 309 on the display 160 and display the preview image 455 in the preview display region designated in step 311 as shown in FIG. 4E.

When the capture event takes place, the electronic device can combine one or more captured images and the captured preview image displayed on the display 160, as the single split screen image and store the split screen image in the memory 110.

Figure 5:
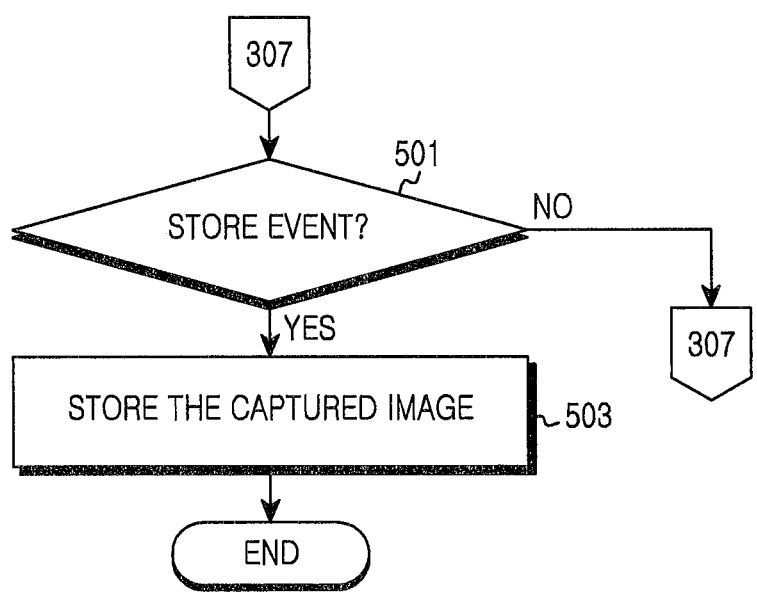
FIG. 5 is a flowchart of a method for storing the captured image in the electronic device according to an exemplary embodiment of the present disclosure.

Alternatively, the electronic device can generate the split screen image and then store the split screen image according to a separate store event as shown in FIG. 5.

FIG. 5 is a flowchart of a method for storing the captured image in the electronic device according to an exemplary embodiment of the present disclosure.

Referring to FIG. 5, the electronic device displays the captured image on the display 160 in step 307 of FIG. 3. For example, when capturing the preview image 423 on the displayed captured image 421 according to the capture event as shown in FIG. 4C, the electronic device can display the captured split screen image 430 on the display 160 as shown in FIG. 4D. In so doing, the electronic device may display the split screen image 430 to separate the first captured image 431 and the second captured image 433.

In step 501, the electronic device determines whether the store event occurs. For example, when displaying one or more captured images on the display 160, the electronic device can recognize a camera icon 435 as a storage icon in FIG. 4D. Hence, the electronic device can determine whether the camera icon 435 is selected. For example, the electronic device can determine whether the touch on the camera icon 435 continues over a reference time in FIG. 4D. For example, the electronic device can determine whether a separate storage icon is selected. For example, the electronic device can determine whether the storage button is input. For example, the electronic device may determine whether the touch on the captured image displayed on the display 160 continues over the reference time.

When the store event does not occur, the electronic device displays the captured image on the display 160 in step 307 of FIG. 3.

By contrast, when the store event occurs, the electronic device can store the captured image displayed on the display 160, in the memory 110 in step 503. For example, the electronic device can store the split screen image including one or more captured images and the preview image in the memory 110. For example, when one or more captured images and the captured preview image displayed on the display 160 are combined to the single split screen image, the electronic device can store the one or more captured images and the captured image as the single split screen image. The electronic device may store one or more captured images and the preview image of the display 160, separately from the split screen image. For example, when the preview image is captured with the one or more captured images displayed on the display 160, the electronic device may individually store the one or more captured images and the captured preview image displayed on the display 160, and additionally store the arrangement information for the split screen image.

FIG. 6 is a flowchart of a method for editing the size of the captured image in the electronic device according to an exemplary embodiment of the present disclosure. Hereafter, the editing of the captured image size is explained based on the screens of FIGS. 4B, 4C, and 7A through 7D, which are provided for the purpose of illustrating examples of features of the present disclosure and are not meant to imply any physical or architectural limitations on the various embodiments that can be implemented in accordance with the principles of the present disclosure.

Referring to FIG. 6, the electronic device displays the captured image on the display 160 in step 307 of FIG. 3. For example, when capturing the preview image 401 of FIG. 4A according to the capture event, the electronic device can display the captured preview image 401 on the display 160 as shown in FIG. 4B. For example, when capturing the preview image 423 with the captured image 421 of FIG. 4C displayed on the display 160 according to the capture event, the electronic device can display the captured split screen image 430 on the display 160 as shown in FIG. 4D. In so doing, the electronic device may display the split screen image 430 to separate the first captured image 431 and the second captured image 433.

In step 601, the electronic device determines whether an edit region is touched. For example, the electronic device can determine whether a region is touched based on edges of the captured image as shown in FIGS. 4B, 4D, 7A, and 7C.

When detecting no touch in the edit region, the electronic device recognizes no size edit event. Hence, the electronic device displays the captured image on the display 160 in step 307.

By contrast, upon detecting the touch in the edit region, the electronic device recognizes the size edit event. Accordingly, the electronic device confirms an edit direction for adjusting the size of the captured image by taking into account a location of the touched edit region in step 603. For example, when detecting a touch 411 on the edit region at the right edge of the captured image as shown in HQ. 4B, the electronic device can recognize that the captured image size is adjusted from the right to the left. For example, when detecting a touch 701 and 731 on the edit region of the upper left corner of the captured image in FIGS. 7A and 7C, the electronic device can recognize that the captured image size is adjusted from the left top to the right bottom.

In step 605, the electronic device determines whether the touch on the edit region moves.

Figure 7A:
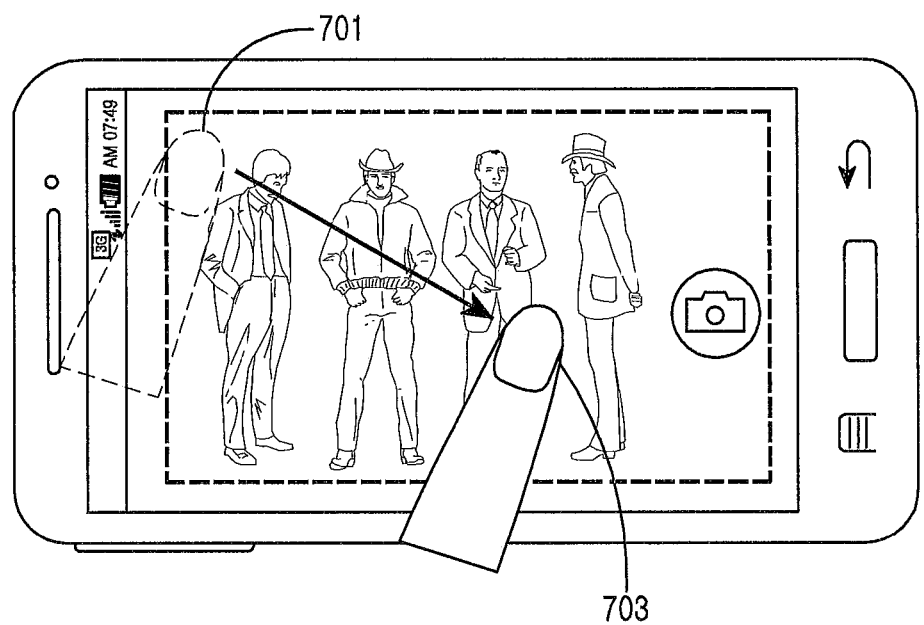
FIGS. 7A through 7D illustrate the screen for editing the size of the captured image according to an exemplary embodiment of the present disclosure.
Figure 7B:
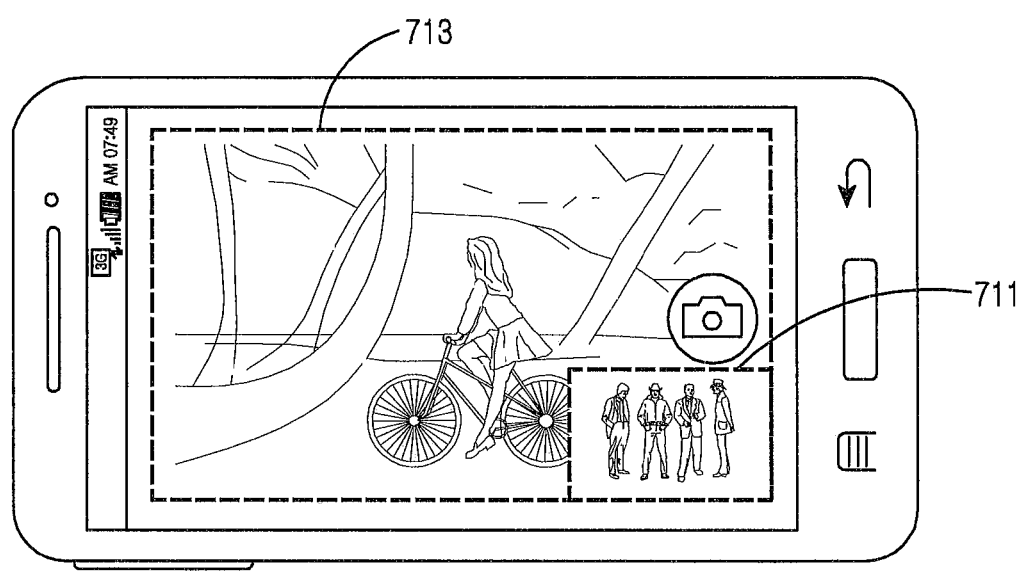
Figure 7C:
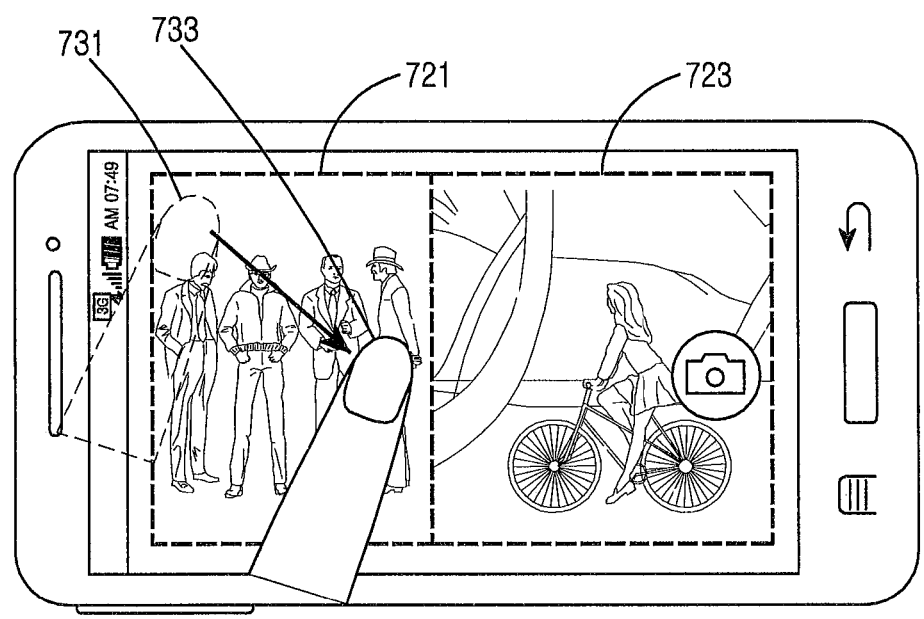
Figure 7D:
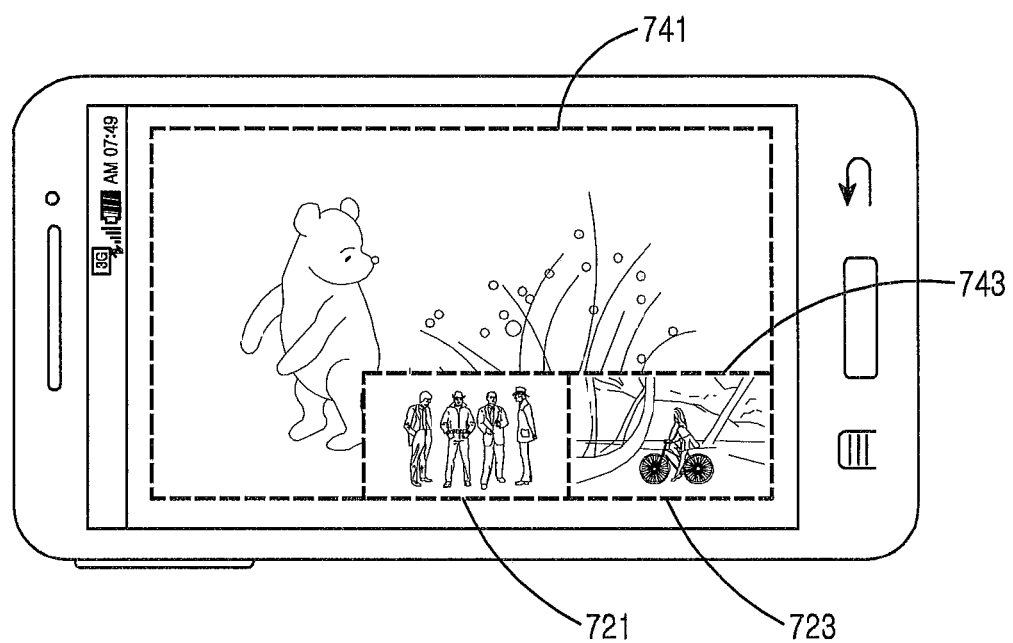

Upon detecting the touch movement, the electronic device edits the captured image size in the edit direction along a touch movement distance in step 607. For example, when detecting the touch movement 411→413 from the right edge of the captured image to the left as shown in FIG. 4B, the electronic device can adjust the size of the captured image 421 based on the touch movement distance as shown in FIG. 4C. For example, when detecting the touch movement 701→703 from the left top to the right bottom of the captured image as shown in FIG. 7A, the electronic device can adjust the size of the captured image 711 based on the touch movement distance as shown in FIG. 7B. For example, when detecting the touch movement 731→733 from the left top to the right bottom of the captured image as shown in FIG. 7C, the electronic device may adjust the whole size of the split screen image 743 based on the touch movement distance as shown in FIG. 7D. That is, the electronic device may adjust the size of the first captured image 721 and the second captured image 723 of the split screen image 743 based on the touch movement distance.

Next, the electronic device sets the preview display region by considering the display region of the edited captured image on the display 160 in step 311 of FIG. 3. For example, the electronic device can designate the region not displaying the captured image 421 as the preview display region as shown in FIG. 4C. For example, the electronic device may designate the region not displaying the captured image 711 as the preview display region as shown in FIG. 7B. For example, the electronic device may recognize the region not displaying the captured images 721 and 723 of the split screen image, as the preview display region as shown in FIG. 7D.

FIG. 8 is a flowchart of a method for editing the captured image size in the electronic device according to another exemplary embodiment of the present disclosure. Hereafter, the editing of the captured image size is explained based on the screens of FIGS. 4D and 4E, which are provided for the purpose of illustrating one example of features of the present disclosure and are not meant to imply any physical or architectural limitations on the various embodiments that can be implemented in accordance with the principles of the present disclosure.

Referring to FIG. 8, the electronic device displays the captured image on the display 160 in step 307 of FIG. 3. For example, when capturing the preview image 423 with the captured image 421 of FIG. 4C displayed on the display 160 according to the capture event, the electronic device can display the split screen image 430 on the display 160 as shown in FIG. 4D. In so doing, the electronic device may display the split screen image 430 to separate the first captured image 431 and the second captured image 433.

In step 801, the electronic device determines whether the edit region is touched. For example, the electronic device can determine whether a region is touched based on the edges of the captured image as shown in FIG. 4D.

When detecting no touch on the edit region, the electronic device recognizes no size edit event. Hence, the electronic device displays the captured image on the display 160 in step 307.

By contrast, upon detecting the touch on the edit region, the electronic device recognizes the size edit event. Accordingly, the electronic device determines a captured image region for editing the size by considering the location of the touched edit region. For example, when the first captured image 431 and the second captured image 433 are displayed as the single split screen image 430 on the display 160 as shown in FIG. 4D, the electronic device can determine the second captured image 433 of the detected touch 441 as the captured image region for the size editing in the edit region. Meanwhile, when detecting the touch on the edit region of the first captured image 431, the electronic device may determine the first captured image 431 as the captured image region for the size editing.

In step 805, the electronic device confirms the edit direction for adjusting the size of the captured image by taking into account the location of the touched edit region. For example, when detecting a touch 441 on the edit region at the right bottom corner of the second captured image 433 as shown in FIG. 4B, the electronic device can recognize that the size of the second captured image 433 is adjusted from the left bottom to the right top.

In step 807, the electronic device determines whether the touch on the edit region moves.

Upon detecting the touch movement, the electronic device edits the captured image size in the edit direction along the touch movement distance in step 809. For example, when detecting the touch movement 441→443 from the right bottom to the left top of the second captured image 433 as shown in FIG. 4D, the electronic device can adjust the size of the second captured image 453 based on the touch movement distance as shown in FIG. 4E. In so doing, the electronic device can reduce information about the second captured image 433 based on the touch movement distance in the buffer containing one or more captured images and the preview image displayed on the display 160.

Next, the electronic device sets the preview display region by considering the display region of the edited captured image on the display 160 in step 311 of FIG. 3. For example, the electronic device can designate the region not displaying the captured images 451→453 as the preview display region as shown in FIG. 4E.

In FIGS. 6 and 8, the electronic device can recognize the size change event when the touch on the edit region of the captured image is detected.

Alternatively, the electronic device may determine the size edit event based on any one of size edit button input, size edit menu selection, and a gesture corresponding to the size edit. When the size edit event occurs, the electronic device can edit the captured image size according to the touch and the touch movement of the captured image.

FIG. 9 is a flowchart of a method for cutting the captured image in the electronic device according to an exemplary embodiment of the present disclosure. Hereafter, the cutting of the captured image is explained based on the screens of FIGS. 10A and 10E, which are provided for the purpose of illustrating one example of features of the present disclosure and are not meant to imply any physical or architectural limitations on the various embodiments that can be implemented in accordance with the principles of the present disclosure.

Referring to FIG. 9, the electronic device displays the captured image on the display 160 in step 307 of FIG. 3. For example, when capturing the preview image 401 of FIG. 4A according to the capture event, the electronic device can display the captured preview image 401 on the display 160 as shown in FIG. 4B.

In step 901, the electronic device determines whether the touch on the captured image is moved.

When detecting no touch movement of the captured image, the electronic device recognizes no cut edit event. Hence, the electronic device displays the captured image on the display 160 in step 307 of FIG. 3.

By contrast, upon detecting the touch movement on the captured image, the electronic device recognizes the cut edit event. Accordingly, the electronic device detects the cut region based on the touch movement in step 903. For example, when detecting the touch movement 1011 and 1013 in a captured image 1001 in FIG. 10A, the electronic device can determine a cut region 1015 in the captured image 1001 based on the touch movement 1011 and 1013.

Figure 10A:
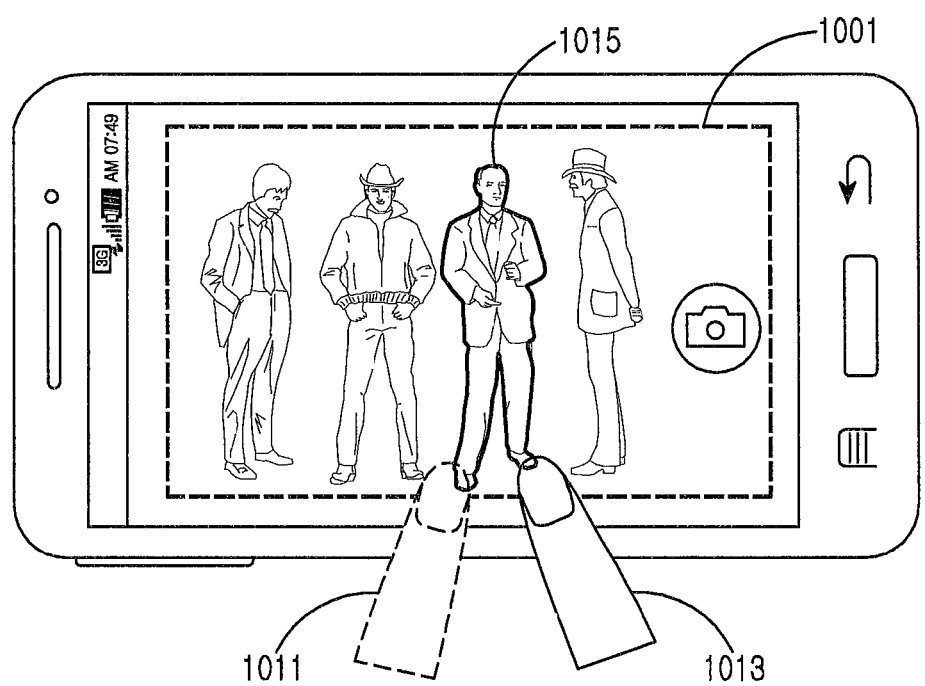
FIGS. 10A and 10B illustrate a screen for cutting the captured image in the electronic device according to an exemplary embodiment of the present disclosure.

In step 905, the electronic device removes the image of the cut region from the captured image. For example, the electronic device can remove the image of the cut region 1015 from the captured image 1001 as shown in FIG. 10A.

Figure 10B:
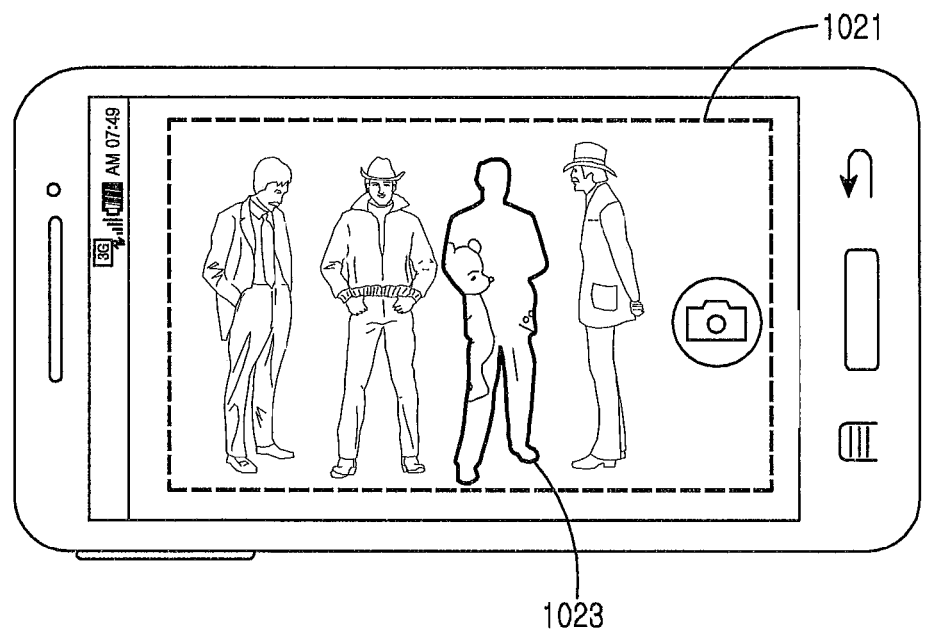

Next, the electronic device can set the preview display region by considering the display region of the edited captured image on the display 160 in step 311 of FIG. 3. For example, the electronic device can set the cut region 1015 of FIG. 10A to the preview display region. Hence, the electronic device can display a preview image 1023 in the preview display region of the captured image 1021 in step 301 of FIG. 3 as shown in FIG. 10B.

FIG. 11 is a flowchart of a method for cutting the captured image in the electronic device according to another exemplary embodiment of the present disclosure. Hereafter, the cutting of the captured image is explained based on the screens of FIGS. 12A and 12B, which are provided for the purpose of illustrating one example of features of the present disclosure and are not meant to imply any physical or architectural limitations on the various embodiments that can be implemented in accordance with the principles of the present disclosure.

Referring to FIG. 11, the electronic device displays the captured image on the display 160 in step 307 of FIG. 3.

In step 1101, the electronic device determines whether the touch on the captured image is moved.

When detecting no touch movement of the captured image, the electronic device recognizes no cut edit event. Hence, the electronic device displays the captured image on the display 160 in step 307 of FIG. 3.

By contrast, upon detecting the touch movement on the captured image, the electronic device recognizes the cut edit event. Accordingly, the electronic device detects the cut region based on the touch movement in step 1103. For example, when detecting touch movement 1211 and 1213 in a captured image 1201 in FIG. 12A, the electronic device can determine a cut region 1215 in the captured image 1201 based on the touch movement 1211 and 1213.

In step 1105, the electronic device extracts the image of the cut region from the captured image. For example, the electronic device can extract the image of the cut region 1215 from the captured image 1201 of FIG. 12A.

Figure 12A:
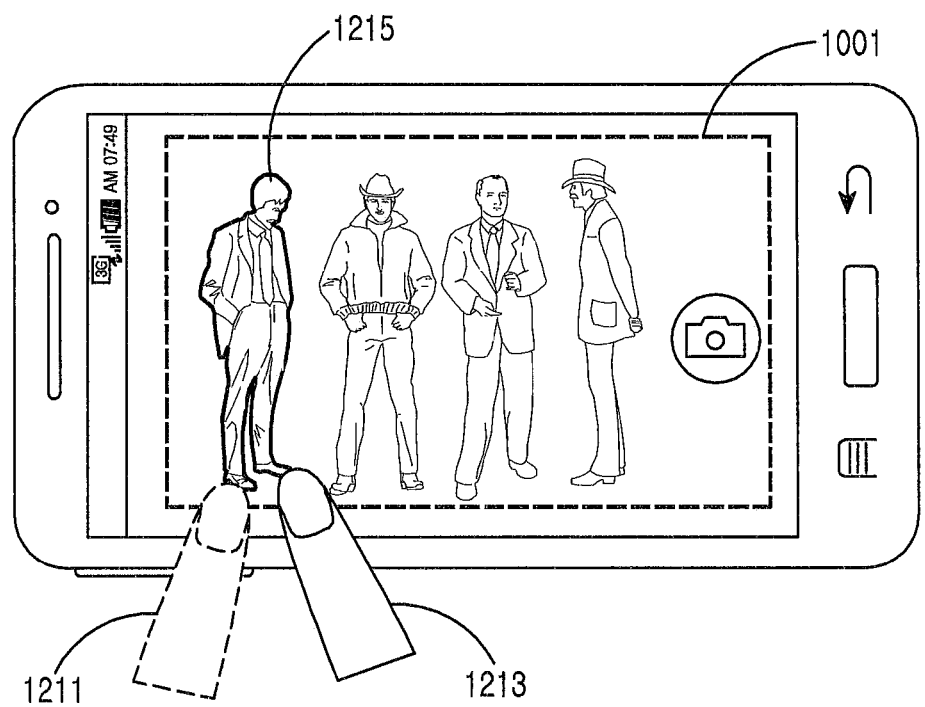
FIGS. 12A and 12B illustrate a screen for cutting the captured image in the electronic device according to another exemplary embodiment of the present disclosure.
Figure 12B:
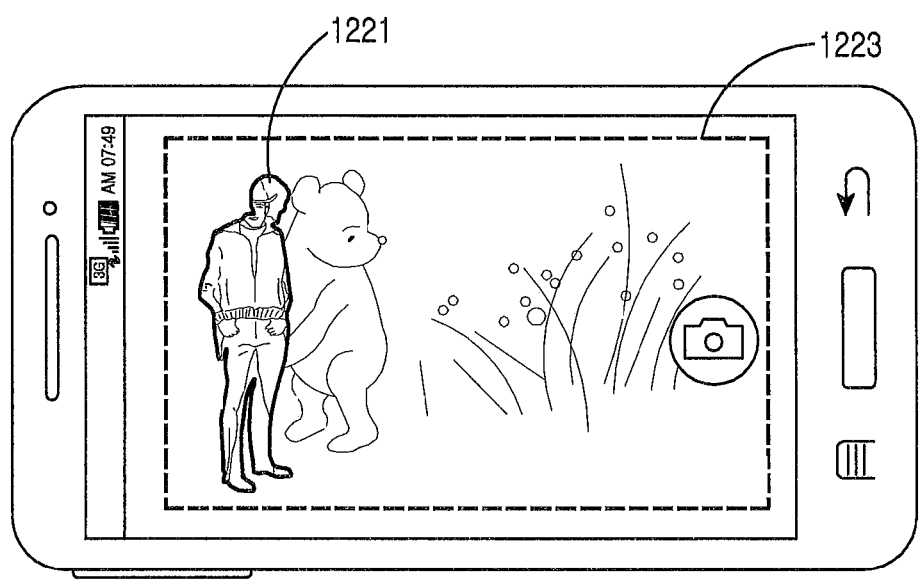

Next, the electronic device sets the preview display region by considering the display region of the edited captured image on the display 160 in step 311 of FIG. 3. For example, the electronic device can set the region excluding the cut region 1215 of FIG. 12A to the preview display region. Hence, the electronic device can display a preview image 1223 in the region excluding the cut region 1221 in step 301 of FIG. 3 as shown in FIG. 12B.

In FIGS. 9 and 11, the electronic device can recognize the cut edit event when the touch movement of the captured image is detected.

Alternatively, the electronic device may determine the cut edit event based on any one of cut edit button input, cut edit menu selection, and a gesture corresponding to the cutting. When the cut edit event occurs, the electronic device can determine the cut region based on the touch movement of the captured image.

FIG. 13 is a flowchart of a method for moving the captured image in the electronic device according to an exemplary embodiment of the present disclosure. Hereafter, the movement of the captured image is explained based on the screens of FIGS. 14A and 14B, which are provided for the purpose of illustrating one example of features of the present disclosure and are not meant to imply any physical or architectural limitations on the various embodiments that can be implemented in accordance with the principles of the present disclosure.

Referring to FIG. 13, the electronic device displays the preview image in the preview display region in step 301 of FIG. 3. For example, the electronic device can display the captured images 451 and 453 edited in step 309 on the display 160 as shown in FIG. 4E, and display the preview image 455 in the preview display region designated in step 311.

In step 1301, the electronic device sets at least part of the captured image displayed on the display 160 to a location movement region. For example, the electronic device can recognize one or more of the captured images displayed on the display 160, which is/are touched continuously during a reference time, as the location movement region. More specifically, of a first captured image 1401 and a second captured image 1403 displayed on the display 160, when the second captured image 1403 is continuously touched over the reference time as shown in FIG. 14A, the electronic device can recognize the second captured image 1403 as the location movement region. For example, the electronic device may recognize the captured image which is touched after a location edit event, as the location movement region. For example, the electronic device may determine the location movement region based on the touch movement detected after the location edit event. Herein, the electronic device can determine the location movement region based on any one of location edit button input, location edit menu selection, and a gesture corresponding to the location edit.

In step 1303, the electronic device changes the location of the image in the location movement region based on the touch movement. For example, when detecting touch movement 1411→1413 in the second captured image 1403 determined as the location movement region in FIG. 14A, the electronic device can change the location of the second captured image 1403 based on the touch movement 1411→1413 as shown in FIG. 14B. In so doing, the electronic device can overlap the captured images. For example, when detecting the touch movement 1411→1413 in the second captured image 1403 in FIG. 14A, the electronic device can display a movement guide region for the second captured image 1403 in the touch movement point 1413. Next, when the touch on the touch movement point 1413 is released, the electronic device can change the location of the second captured image 1403 into the movement guide region. Herein, the movement guide region can be displayed merely with an outline.

Next, the electronic device can display the preview image in the preview display region changed based on the movement of the captured image on the display 160 in step 311 of FIG. 3. For example, when changing the location of a second captured image 1423 as shown in FIG. 14B, the electronic device can display a preview image 1425 by setting the region not displaying the captured images 1421→1423 to the preview display region as shown in FIG. 14B.

FIG. 15 is a flowchart of a method for deleting the captured image in the electronic device according to an exemplary embodiment of the present disclosure. Hereafter, the deletion of the captured image is explained based on the screen of FIG. 16, which is provided for the purpose of illustrating one example of features of the present disclosure and are not meant to imply any physical or architectural limitations on the various embodiments that can be implemented in accordance with the principles of the present disclosure.

Referring to FIG. 15, the electronic device displays the preview image in the preview display region in step 301 of FIG. 3. For example, the electronic device can display the captured images 451→453 edited in step 309 on the display 160 as shown in FIG. 4E, and display the preview image 455 in the preview display region designated in step 311.

In step 1501, the electronic device sets a deletion region in the captured image displayed on the display 160. For example, the electronic device can recognize one or more of the captured images displayed on the display 160, which is/are touched continuously during the reference time, as the deletion region. More specifically, when the first captured image 451 of the first captured image 451 and the second captured image 453 displayed on the display 160, is continuously touched over the reference time as shown in FIG. 4E, the electronic device can recognize the first captured image 451 as the deletion region. For example, when consecutive touches are applied to the captured image, the electronic device can recognize the touched captured image as the deletion region. More specifically, when the first captured image 451 of the first captured image 451 and the second captured image 453 displayed on the display 160 in FIG. 4E, is touched twice in a row, the electronic device can recognize the first captured image 451 as the deletion region. For example, the electronic device may recognize the captured image which is touched after the location edit event occurs, as the deletion region. For example, the electronic device may determine the deletion region based on the touch movement detected after the location edit event. Herein, the electronic device can determine the location movement event based on any one of the location edit button input, the location edit menu selection, and the gesture corresponding to the location edit.

In step 1503, the electronic device deletes the image in the deletion region. For example, when recognizing the deletion of the first captured image 451 in FIG. 4E, the electronic device can delete the first captured image 451 as shown in FIG. 16.

Next, the electronic device can display the preview image in the preview display region changed based on the deleted captured image on the display 160 in step 311 of FIG. 3. For example, when deleting the first captured image 451 as shown in FIG. 16, the electronic device can display a preview image 1603 by recognizing the region not displaying a second captured image 1601 as the preview display region.

Figure 17:
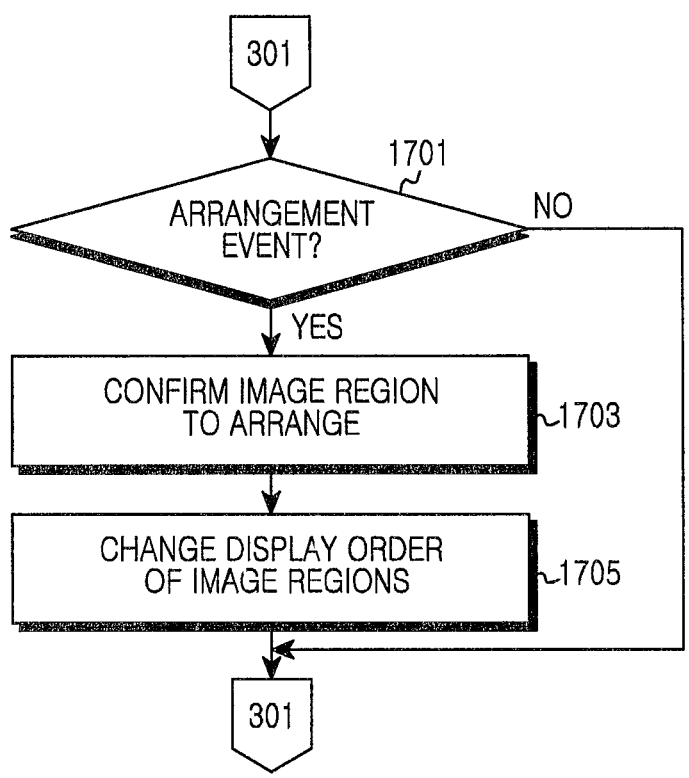
FIG. 17 is a flowchart of a method for arranging the captured image in the electronic device according to an exemplary embodiment of the present disclosure.

FIG. 17 is a flowchart of a method for arranging the captured image in the electronic device according to an exemplary embodiment of the present disclosure. Hereafter, the arrangement of the captured image is explained based on the screen of FIG. 18, which is provided for the purpose of illustrating one example of features of the present disclosure and are not meant to imply any physical or architectural limitations on the various embodiments that can be implemented in accordance with the principles of the present disclosure.

Referring to FIG. 17, the electronic device displays the preview image in the preview display region in step 301 of FIG. 3. For example, the electronic device can display the captured images 1421 and 1423 edited in step 309 on the display 160 as shown in FIG. 14B, and display the preview image 1425 in the other region.

In step 1701, the electronic device determines whether an arrangement event is detected. For example, the electronic device can determine whether the captured image is kept touched over the reference time. For example, the electronic device may determine whether consecutive touches are detected on the captured image. For example, the electronic device may determine the arrangement event based on any one of arrangement button input, arrangement menu selection, and the gesture corresponding to the arrangement event.

When detecting no arrangement event, the electronic device displays the preview image in the preview display region in step 301 of FIG. 3.

When detecting the arrangement event, the electronic device confirms the image region to arrange in step 1703. For example, upon determining the arrangement event based on the continuous touch time on the captured image, the electronic device can recognize the captured image touched over the continuous touch time, as the image region. More specifically, when the touch is continued on the second captured image 1423 of the first captured image 1421 and the second captured image 1423 of FIG. 14B over the reference time, the electronic device can recognize the second captured image 1423 as the image region to arrange. For example, upon detecting the arrangement event based on the continuous touch information of the captured image, the electronic device can recognize the captured image continuously touched, as the image region to arrange. More specifically, when detecting the consecutive touches on the second captured image 1423 of the first captured image 1421 and the second captured image 1423 of FIG. 14B, the electronic device can recognize the second captured image 1423 as the image region to arrange. For example, when confirming the location edit event based on any one of the location edit button input, the location edit menu selection, and the location edit gesture, the electronic device may recognize the captured image touched after the arrangement event, as the image arrangement region.

In step 1705, the electronic device changes the display order of the image arrangement region. For example, to arrange the second captured image 1423 of the first captured image 1421 and the second captured image 1423 of FIG. 14B, the electronic device can change the display order such that a first captured image 1801 is placed over a second captured image 1803 as shown in FIG. 18. More specifically, the electronic device can arrange the captured images by converting data of an overlapped region 1811 of the captured images to data of the first captured image 1801 based on the arrangement order in the buffer containing the captured images 1801 and 1803 and the preview image 1805 on the display 160.

Next, the electronic device can display the preview image in the preview display region of the display 160 in step 311 of FIG. 3.

Figure 19:
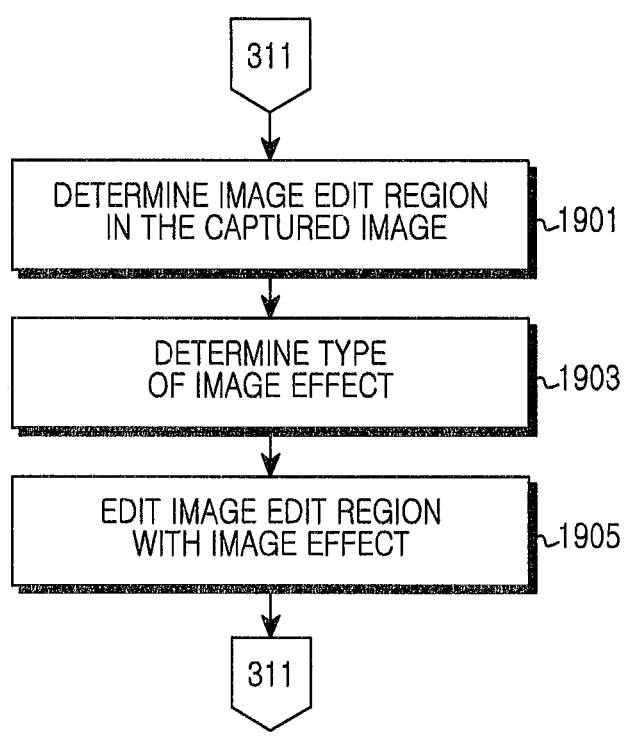
FIG. 19 is a flowchart of a method for adding an image effect to the captured image in the electronic device according to an exemplary embodiment of the present disclosure.

FIG. 19 is a flowchart of a method for adding the image effect to the captured image in the electronic device according to an exemplary embodiment of the present disclosure. Hereafter, the image effect added to the captured image is explained based on the screens of FIGS. 20A and 20B, which are provided for the purpose of illustrating one example of features of the present disclosure and are not meant to imply any physical or architectural limitations on the various embodiments that can be implemented in accordance with the principles of the present disclosure.

Referring to FIG. 19, the electronic device displays the preview image in the preview display region in step 301 of FIG. 3. For example, the electronic device can display the captured images 451 and 453 on the display 160 as shown in FIG. 4E, and display the preview image 455 in the other region. For example, the electronic device can display the captured images 1421 and 1423 on the display 160 as shown in FIG. 14B, and display the preview image 1425 in the other region.

In step 1901, the electronic device determines the image edit region. For example, upon detecting the touch continued on the captured image on the display 160 over the reference time, the electronic device recognizes the image edit event.

In so doing, the electronic device can recognize the captured image touched over the continuous touch time, as the image edit region. More specifically, when the touch is continued on a second captured image 2003 of a first captured image 2001 and the second captured image 2003 of FIG. 20A over the reference time, the electronic device can recognize the second captured image 2003 or 2013 as the image edit region. For example, upon detecting the consecutive touches on the captured images on the display 160, the electronic device can recognize the image edit event. In so doing, the electronic device can recognize the captured image consecutively touched, as the image edit region. More specifically, when detecting the consecutive touches on the second captured image 2003 of the first captured image 2001 and the second captured image 2003 of FIG. 20A, the electronic device can recognize the second captured image 2003 as the image edit region. For example, the electronic device may determine the captured image touched after the image edit event, as the image edit region. For example, the electronic device may determine the image edit region based on the touch movement detected after the image edit event. The electronic device may determine the image edit event based on any one of the location edit button input, the location edit menu selection, and the location edit gesture.

In step 1903, the electronic device determines a type of the image effect to add to the image edit region. For example, the electronic device can confirm a preset image effect. For example, the electronic device can display an image effect list available for the image edit region, on the display 160. Next, the electronic device may confirm the image effect selected in the image effect list according to the input signal fed from the input part 170.

In step 1905, the electronic device adds the image effect to the image edit region. For example, when determining the second captured image 2003 as the image edit region in FIG. 20A, the electronic device can apply a mono filter effect to the second captured image 2003 as shown in FIG. 20A. For example, when determining the first captured image 2011 as the image edit region in FIG. 20B, the electronic device may apply the mono filter effect to the first captured image 2011 as shown in FIG. 20B.

Next, the electronic device can display the preview image in the preview display region of the display 160 in step 311 of FIG. 3.

As such, the electronic device can add the image effect to the entire image edit region.

Alternatively, the electronic device may add the image effect only to the corners of the image edit region.

The electronic device can select the image edit region and then selects the image effect.

Alternatively, the electronic device may select the image effect and then select the image edit region.

The electronic device can individually store the plurality of the captured images of the split screen image. In this case, the electronic device can display the split screen image using the arrangement information of the split screen image as shown in FIG. 21.

Figure 21:
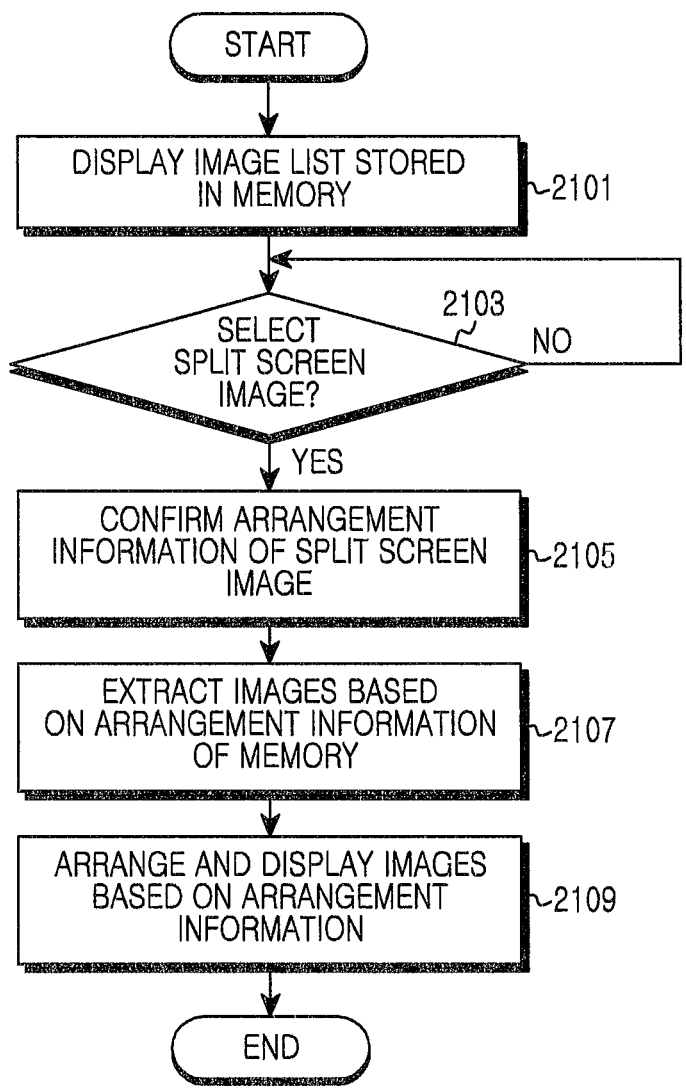
FIG. 21 is a flowchart of a method for displaying the split screen image in the electronic device according to an exemplary embodiment of the present disclosure.

FIG. 21 is a flowchart of a method for displaying the split screen image in the electronic device according to an exemplary embodiment of the present disclosure.

Referring to FIG. 21, the electronic device displays an image list stored in the memory 110, on the display 160 in step 2101. For example, the electronic device can display thumbnails of the images stored in the memory 110, on the display 160.

In step 2103, the electronic device determines whether the split screen image is selected in the image list according to the input signal fed from the input part 170.

When the split screen image is selected, the electronic device confirms the arrangement information of the split screen image in step 2105. Herein, the arrangement information can include one or more of the identification information, the location, and the display order of the captured images of the split screen image.

In step 2107, the electronic device extracts the captured images of the split screen image from the memory 110 by considering the captured image identification information of the arrangement information of the split screen image.

In step 2109, the electronic device generates and displays the split screen image by arranging the captured images based on the captured image location and the captured image display order information of the arrangement information of the split screen image.

According to one aspect of the present disclosure, a method for capturing an image in the electronic device includes capturing a first image; displaying the first image on a display; changing one or more of a location, a size, or a shape of the first image displayed on the display; and displaying a second image outside a region displaying the first image on the display.

The second image includes a preview image.

The method may further include, after displaying the second image, capturing the second image; and combining the captured first image and second image into a single image.

The method may further include, when the captured first image and second image are combined into the single image, storing the captured first image and second image as the single image.

The method may further include, when the captured first image and second image are combined into the single image, individually storing the first image and second image combined to the single image; and storing arrangement information of the first image and the second image combined into the single image.

The arrangement information includes one or more of identification information of the first and second images of the single image, locations of the first and second images of the single image, or a display order of the first and second images of the single image.

The capturing the first image includes, when the display displays a plurality of images, capturing the plurality of images as a single image.

The changing of the first image includes detecting a touch in a preset edit region defined based on edges of the first image; and changing the size of the first image by considering a movement distance of a touch point of the edit region.

The changing of the first image includes detecting a touch on the first image; determining a cut region in the first image by considering a movement distance of the touch point; and deleting or extracting image content from the cut region.

The changing of the first image includes determining a location movement region in the first image displayed on the display; and changing the location of the first image in the location movement region by considering touch information of the location movement region.

The changing of the location of the first image in the location movement region includes changing the location of the first image in the location movement region based on the touch information of the location movement region such that the image overlaps another image displayed on the display.

The changing of the first image includes determining a deletion region by considering touch information of the first image displayed on the display; and deleting image content in the deletion region.

The changing of the first image includes determining an image edit region by considering touch information of the first image displayed on the display; and adding an image effect to the image edit region.

The changing of the first image includes determining an arrangement region by considering touch information of the first image displayed on the display; and when a plurality of images overlaps in the arrangement region, changing a display order of the images overlapped in the arrangement region.

According to one aspect of the present disclosure, a method for capturing an image in the electronic device includes displaying a first image in a first region of a display; displaying a second image in a second region of the display; and when a capture event occurs, combining the first image and the second image into a third image.

The method may further include, after generating the third image, storing the first image and the second image as the third image.

The method may further include, after generating the third image, storing the first image and the second image individually; and storing arrangement information of the first image and the second image combined into the third image.

The arrangement information includes one or more of identification information of the first and second images of the third image, locations of the first and second images of the third image, and a display order of the first and second images of the third image.

As such, the electronic device can capture the image acquired by the camera and then display the preview image in the region generated by the captured image editing.

Alternatively, the electronic device may display the image stored in the memory 110 on the display 160, and then display the preview image in the region generated by editing the displayed captured image. When the capture event occurs, the electronic device can capture the images and the preview image displayed on the display 160 as the single split screen image.

As set forth above, the electronic device can create the split screen image in the imaging mode and thus generate various split screen images based on the user's intention.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method of operating an electronic device, the method comprising:
    capturing a first image;
    displaying the first image on a display;
    changing one or more of a location, a size, or a shape of the first image displayed on the display;
    creating a region for displaying a second image as a function of a change in the one or more of the location, the size or the shape of the first image; and
    displaying the second image outside a region displaying the changed first image on the display, wherein a total area of the display consists of a first area occupied by the first image and a second area occupied by the second image in the created region.

2. The method of claim 1, wherein the second image comprises a preview image.

3. The method of claim 1, further comprising:
    after displaying the second image, capturing the second image; and
    combining the captured first image and second image into a single image.

4. The method of claim 3, further comprising:
    when the captured first image and second image are combined into the single image, storing the captured first image and second image as the single image.

5. The method of claim 3, further comprising:
    when the captured first image and second image are combined into the single image, individually storing the first image and second image combined to the single image; and
    storing arrangement information of the first image and the second image combined into the single image.

6. The method of claim 5, wherein the arrangement information comprises one or more of identification information of the first and second images of the single image, locations of the first and second images of the single image, or a display order of the first and second images of the single image.

7. The method of claim 1, wherein capturing the first image comprises:
    when the display displays a plurality of images, capturing the plurality of images as a single image.

8. The method of claim 1, wherein the changing of the first image comprises:
    detecting a touch in a preset edit region defined based on edges of the first image; and
    changing the size of the first image by considering a movement distance of a touch point of the preset edit region.

9. The method of claim 1, wherein the changing of the first image comprises:
    detecting a touch on the first image;

determining a cut region in the first image by considering a movement distance of a touch point; and deleting or extracting image content from the cut region.

10. The method of claim 1, wherein the changing of the first image comprises:

determining a location movement region in the first image displayed on the display; and changing the location of the first image in the location movement region by considering touch information of the location movement region.

11. The method of claim 10, wherein the changing of the location of the first image in the location movement region comprises:

changing the location of the first image in the location movement region based on the touch information of the location movement region such that the first image overlaps another image displayed on the display.

12. The method of claim 1, wherein the changing of the first image comprises:

determining a deletion region by considering touch information of the first image displayed on the display; and deleting image content in the deletion region.

13. The method of claim 1, wherein the changing of the first image comprises:

determining an image edit region by considering touch information of the first image displayed on the display; and adding an image effect to the image edit region.

14. The method of claim 1, wherein the changing of the first image comprises:

determining an arrangement region by considering touch information of the first image displayed on the display; and when a plurality of images overlaps in the arrangement region, changing a display order of the images overlapped in the arrangement region.

15. The method of claim 1, wherein a size of the first area is different than a size of the second area.

16. An electronic device comprising:
an image sensor;
a display; and
a processor configured to control to:
when capturing a first image, cause the display to display the first image;
change one or more of a location, a size, and a shape of the first image displayed on the display,
create a region for displaying a second image as a function of a change in the one or more of the location, the size or the shape of the first image; and
cause the display to display the second image fed from the image sensor outside a region displaying the changed first image, wherein a total area of the display consists of a first area occupied by the first image and a second area occupied by the second image in the created region.

17. The electronic device of claim 16, wherein the second image comprises a preview image.

18. The electronic device of claim 16, wherein, the processor is further configured to control to, after display of the second image fed from the image sensor outside the changed first image, capture the second image and combine the captured first image and second image into a single image.

19. The electronic device of claim 18, further comprising:
a memory configured to store data, wherein, when the captured first image and second image are combined to the single image, the processor is configured to store the captured first image and second image displayed on the display as the single image in the memory.

20. The electronic device of claim 18, further comprising:
a memory configured to store data, wherein, when the captured first image and second image are combined to the single image, the processor is configured to individually store the first image and second image combined into the single image in the memory, and store arrangement information of the first image and the second image combined into the single image in the memory.

21. The electronic device of claim 20, wherein the arrangement information comprises one or more of identification information of the first and second images of the single image, locations of the first and second images of the single image, and a display order of the first and second images of the single image.

22. The electronic device of claim 16, wherein, when the display displays a plurality of images, the processor is configured to control to capture the plurality of images as a single image.

23. The electronic device of claim 16, wherein the processor is configured to control to detect a touch in a preset edit region defined based on edges of the first image, and change the size of the first image by considering a movement distance of a touch point of the edit region.

24. The electronic device of claim 16, wherein the processor is configured to control to detect a touch on the first image, determine a cut region in the first image by considering a movement distance of a touch point, and delete or extract image content from the cut region.

25. The electronic device of claim 16, wherein the processor is configured to control to determine a location movement region in the first image displayed on the display, and change the location of the first image in the location movement region by considering touch information of the location movement region.

26. The electronic device of claim 25, wherein the processor is configured to control to change the location of the first image in the location movement region based on the touch information of the location movement region such that the first image overlaps another image displayed on the display.

27. The electronic device of claim 16, wherein the processor is configured to control to determine a deletion region by considering touch information of the first image displayed on the display, and delete image content in the deletion region.

28. The electronic device of claim 16, wherein the processor is configured to control to determine an image edit region by considering touch information of the first image displayed on the display, and add an image effect to the image edit region.

29. The electronic device of claim 16, wherein the processor is configured to control to determine an arrangement region by considering touch information of the first image displayed on the display, and, when a plurality of images overlaps in the arrangement region, change the display order of the images overlapped in the arrangement region.

30. The electronic device of claim 16, wherein a size of the first area is different than a size of the second area.

* * * * *